(12) United States Patent
Kwak et al.

(10) Patent No.: US 10,433,181 B2
(45) Date of Patent: *Oct. 1, 2019

(54) METHOD, DEVICE, AND SYSTEM FOR SIGNAL TRANSMISSION IN UNLICENSED BAND

(71) Applicant: WILUS INSTITUTE OF STANDARDS AND TECHNOLOGY INC., Gyeonggi-do (KR)

(72) Inventors: Jinsam Kwak, Gyeonggi-do (KR);
Juhyung Son, Gyeonggi-do (KR);
Geonjung Ko, Gyeonggi-do (KR);
Minseok Noh, Seoul (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,721

(22) Filed: Jul. 20, 2018

(65) Prior Publication Data
US 2019/0014483 A1 Jan. 10, 2019

Related U.S. Application Data

(63) Continuation of application No. 15/813,108, filed on Nov. 14, 2017, now Pat. No. 10,057,785, which is a
(Continued)

(30) Foreign Application Priority Data

May 16, 2015 (KR) .................. 10-2015-0068415
Aug. 14, 2015 (KR) .................. 10-2015-0115060
(Continued)

(51) Int. Cl.
*H04W 16/14* (2009.01)
*H04W 74/08* (2009.01)
(Continued)

(52) U.S. Cl.
CPC ............. *H04W 16/14* (2013.01); *H04L 5/00* (2013.01); *H04L 27/26* (2013.01);
(Continued)

(58) Field of Classification Search
CPC ............ H04W 16/14; H04W 74/0825; H04W 84/045; H04L 5/00; H04L 74/0808; H04L 27/26
See application file for complete search history.

(56) References Cited

U.S. PATENT DOCUMENTS

2016/0135148 A1* 5/2016 Novlan .................. H04L 1/00
370/329
2016/0227428 A1* 8/2016 Novlan ................. H04W 24/10
(Continued)

FOREIGN PATENT DOCUMENTS

| JP | 2015-91132 | 5/2015 |
| WO | 2013/006006 | 1/2013 |
| WO | 2016/186406 | 11/2016 |

OTHER PUBLICATIONS

International Search Report for PCT/KR2016/005140 dated Aug. 31, 2016 and its English translation from WIPO (published as Wo 2016/186406).
(Continued)

*Primary Examiner* — Asghar H Bilgrami
(74) *Attorney, Agent, or Firm* — Ladas & Parry, LLP

(57) ABSTRACT

Disclosed relates to a method, device, and system for performing downlink transmission. Specifically, the disclosed relates to a method including when the downlink signal includes a physical downlink shared channel (PDSCH) and a channel in the specific cell is sensed to be idle for a first predefined interval, wherein the processor performs backoff after the second predefined time in order to perform the downlink transmission, and when the downlink transmission includes a Discovery Reference Signal (DRS)
(Continued)

and the channel in the specific cell is sensed to be idle for a second predefined interval, performing the downlink transmission immediately after the second predefined interval, and a device and system therefor.

16 Claims, 31 Drawing Sheets

Related U.S. Application Data continuation of application No. PCT/KR2016/005140, filed on May 16, 2016.

(30) Foreign Application Priority Data

| Sep. 1, 2015 | (KR) | .......................... | 10-2015-0123521 |
| Sep. 22, 2015 | (KR) | .......................... | 10-2015-0134186 |

(51) Int. Cl.
*H04L 5/00* (2006.01)
*H04L 27/26* (2006.01)
*H04W 84/04* (2009.01)

(52) U.S. Cl.
CPC ... *H04W 74/0808* (2013.01); *H04W 74/0825* (2013.01); *H04W 84/045* (2013.01)

(56) References Cited

U.S. PATENT DOCUMENTS

2017/0048041 A1* 2/2017 Yi .......................... H04L 5/0048
2018/0084432 A1  3/2018 Kwak et al.

OTHER PUBLICATIONS

Written Opinion of the International Searching Authority for PCT/KR2016/005140 dated Aug. 31, 2016 and its English translation from WIPO (published as WO 2016/186406).

International Preliminary Report of Patentability (Chapter I) for PCT/KR2016/005140 dated Nov. 21, 2017 and its English translation from WIPO (published as WO 2016/186406).

Notice of Allowance dated Apr. 17, 2018 for U.S. Appl. No. 15/813,108 (Published as US 2018/0084432).

LG Electronics, "LBT Operation for LAA DL", R1-151514, 3GPP TSG RAN WG1 Meeting #80bis, Belgrade, Serbia, Apr. 11, 2015, Section 2.1-2.2 and figures 3-4.

ZTE, "Discussion on LBT Design for LAA", R1-151809, 3GPP TSG RAN WG1 Meeting #80bis, Belgrade, Serbia, Apr. 11, 2015, Section 2.1-2.1 and figures 1-2.

Mediatek Inc., "DRS Enhancements for RRM/CSI Measurements in LAA", R1-151941, 3GPP TSG RAN WG1 Meeting #80bis, Belgrade, Serbia, Apr. 11, 2015, Section 2.1 and figures 1-2.

* cited by examiner

METHOD, DEVICE, AND SYSTEM FOR SIGNAL TRANSMISSION IN UNLICENSED BAND

CROSS-REFERENCE TO RELATED APPLICATIONS

This application is a continuation of U.S. patent application Ser. No. 15/813,108 filed on Nov. 14, 2017, which is a continuation of International Patent Application No. PCT/KR2016/005140 filed on May 16, 2016, which claims the priority to Korean Patent Application No. 10-2015-0068415 filed in the Korean Intellectual Property Office on May 16, 2015, Korean Patent Application No. 10-2015-0115060 filed in the Korean Intellectual Property Office on Aug. 14, 2015, Korean Patent Application No. 10-2015-0123521 filed in the Korean Intellectual Property Office on Sep. 1, 2015 and Korean Patent Application No. 10-2015-0134186 filed in the Korean Intellectual Property Office on Sep. 22, 2015, the entire contents of which are incorporated herein by reference.

TECHNICAL FIELD

The present invention relates to a wireless communication system. Specifically, the present invention relates to a method, device, and system for performing a signal in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

In one aspect of the present invention, provided is a method for performing downlink transmission in a specific cell in a cellular wireless communication system, and the method includes: when the downlink transmission includes a physical downlink shared channel (PDSCH) and a channel in the specific cell is sensed to be idle for a first predefined interval, performing backoff after the first predefined interval in order to perform the downlink transmission; and when the downlink transmission includes a Discovery Reference Signal (DRS) and the channel in the specific cell is sensed to be idle for a second predefined interval, performing the downlink transmission immediately after the second predefined interval.

In another aspect of the present invention, provided is a base station used in a cellular wireless communication system, and the base station includes: a wireless communication module; and a processor, when the downlink signal includes a physical downlink shared channel (PDSCH) and a channel in the specific cell is sensed to be idle for a first predefined interval, wherein the processor performs backoff after the first predefined time in order to perform the downlink transmission, and when the downlink transmission includes a Discovery Reference Signal (DRS) and the channel in the specific cell is sensed to be idle for a first predefined interval.

Preferably, the channel in the specific cell may be sensed after a previous downlink transmission fails. Herein, the previous downlink transmission may fail because the channel in the specific cell is busy.

Preferably, the DRS may be transmitted in a periodically-configured Discovery Measurement Timing Configuration (DMTC).

Preferably, the DRS may be configured with at least one of Cell-specific Reference Signal (CRS), Primary Synchronization Signal (PSS), Secondary Synchronization Signal (SSS), and Channel State Information (CSI)-RS.

Preferably, the DRS may be configured in subframe units, and all the CRS, PSS, SSS, and CSI-RS are included in one subframe.

Preferably, no signal may be transmitted in a last Orthogonal Frequency Division Multiplexing (OFDM) symbol of a subframe configured with the DRS.

Preferably, the backoff may include generating a random number N (N≥0) in a contention window size and waiting for N slots when the channel in the specific cell is idle.

Preferably, the specific cell may be an unlicensed cell, and the cellular wireless communication system may be a 3rd Generation Partnership Project (3GPP) communication system.

In another aspect of the present invention, provided is a method for performing downlink transmission in a specific cell by a base station in a cellular wireless communication system, and the method includes: when the downlink signal includes a physical downlink shared channel (PDSCH) and a channel in the specific cell is sensed to be idle for a first predefined interval after a fail of a first downlink transmission, performing backoff after the first predefined time in order to perform a second downlink transmission; and when the downlink signal includes a Discovery Reference Signal (DRS) and the channel in the specific cell is sensed to be idle for a second predefined interval after the fail of the first downlink transmission, and performing the second downlink transmission immediately after the second predefined interval.

In another aspect of the present invention, provided is a base station used in a cellular wireless communication system, and the base station includes: a wireless communication module; and a processor, when the downlink signal includes a physical downlink shared channel (PDSCH) and a channel in the specific cell is sensed to be idle for a first predefined interval after a fail of a first downlink transmission, wherein the processor performs backoff after the first predefined time in order to perform a second downlink transmission, and when the downlink includes a Discovery Reference Signal (DRS) and the channel in the specific cell is sensed to be idle for a second predefined interval after the fail of the first transmission, wherein the processor performs the second downlink transmission immediately after the second predefined interval. Preferably, the first downlink transmission may fail because the channel in the specific cell is busy.

Preferably, the DRS may be transmitted in a periodically-configured Discovery Measurement Timing Configuration (DMTC).

Preferably, the DRS may be configured with at least one of Cell-specific Reference Signal (CRS), Primary Synchronization Signal (PSS), Secondary Synchronization Signal (SSS), and Channel State Information (CSI)-RS.

Preferably, the DRS may be configured in subframe units, and all the CRS, PSS, SSS, and CSI-RS are included in one subframe.

Preferably, no signal may be transmitted in a last Orthogonal Frequency Division Multiplexing (OFDM) symbol of a subframe configured with the DRS.

Preferably, the backoff may include generating a random number N (N≥0) in a contention window size and waiting for N slots when the channel in the specific cell is in an idle state.

Preferably, the specific cell may be an unlicensed cell, and the cellular wireless communication system may be a 3rd Generation Partnership Project (3GPP) communication system.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently transmitting a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINGS

In order to help understand the present invention, the accompanying drawings which are included as a part of the Detailed Description provide embodiments of the present invention and describe the technical matters of the present invention together with the Detailed Description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
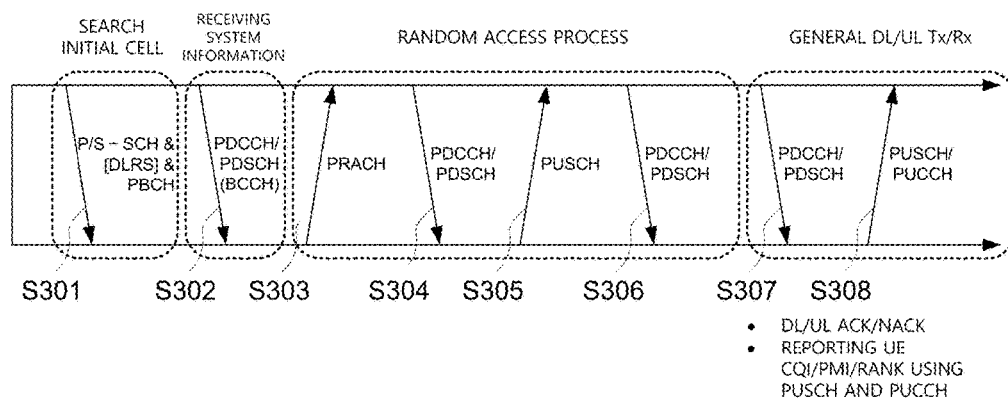
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
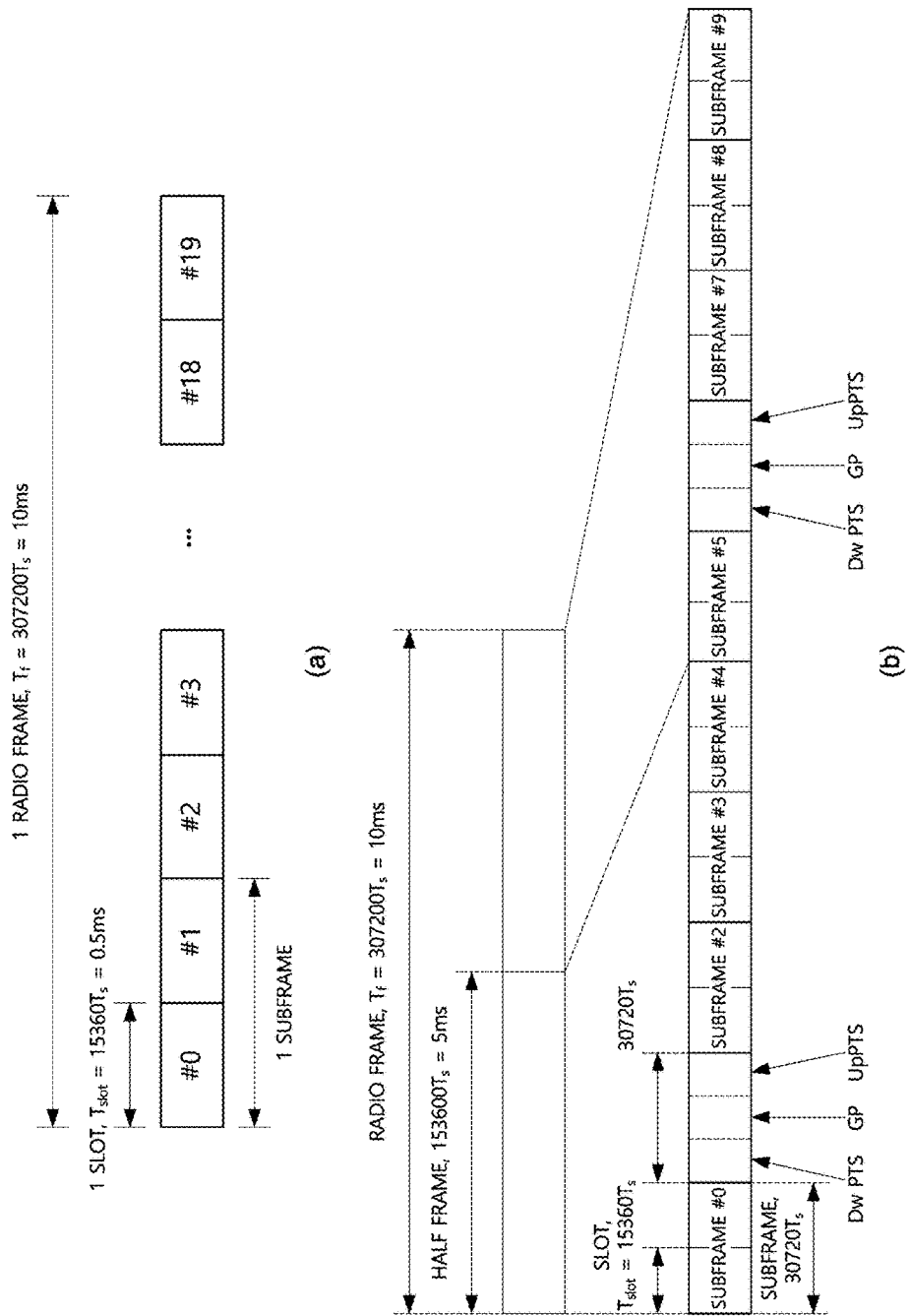
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
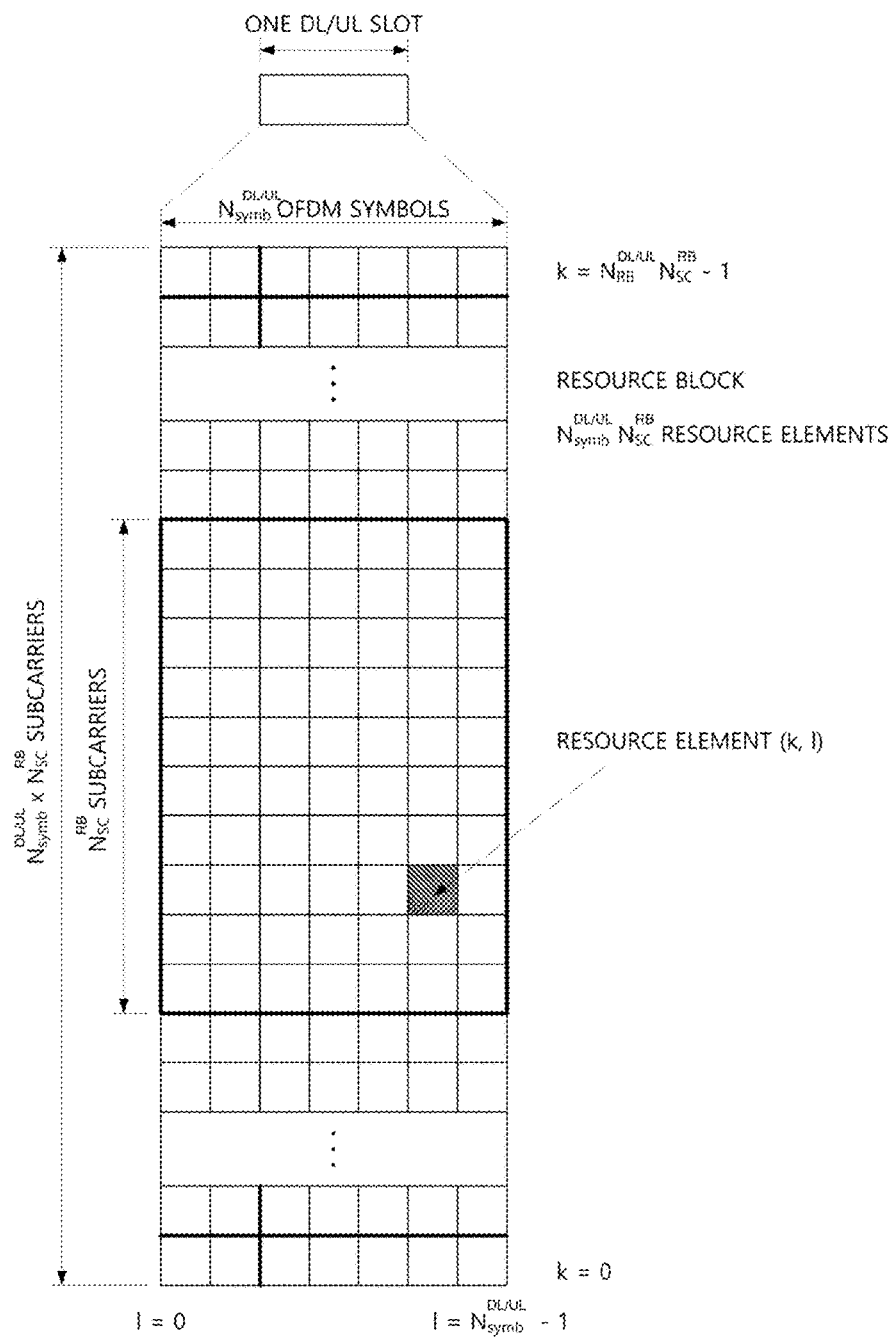
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{RB} * N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB} * N^{RB}_{sc} - 1$ in the frequency domain and l represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
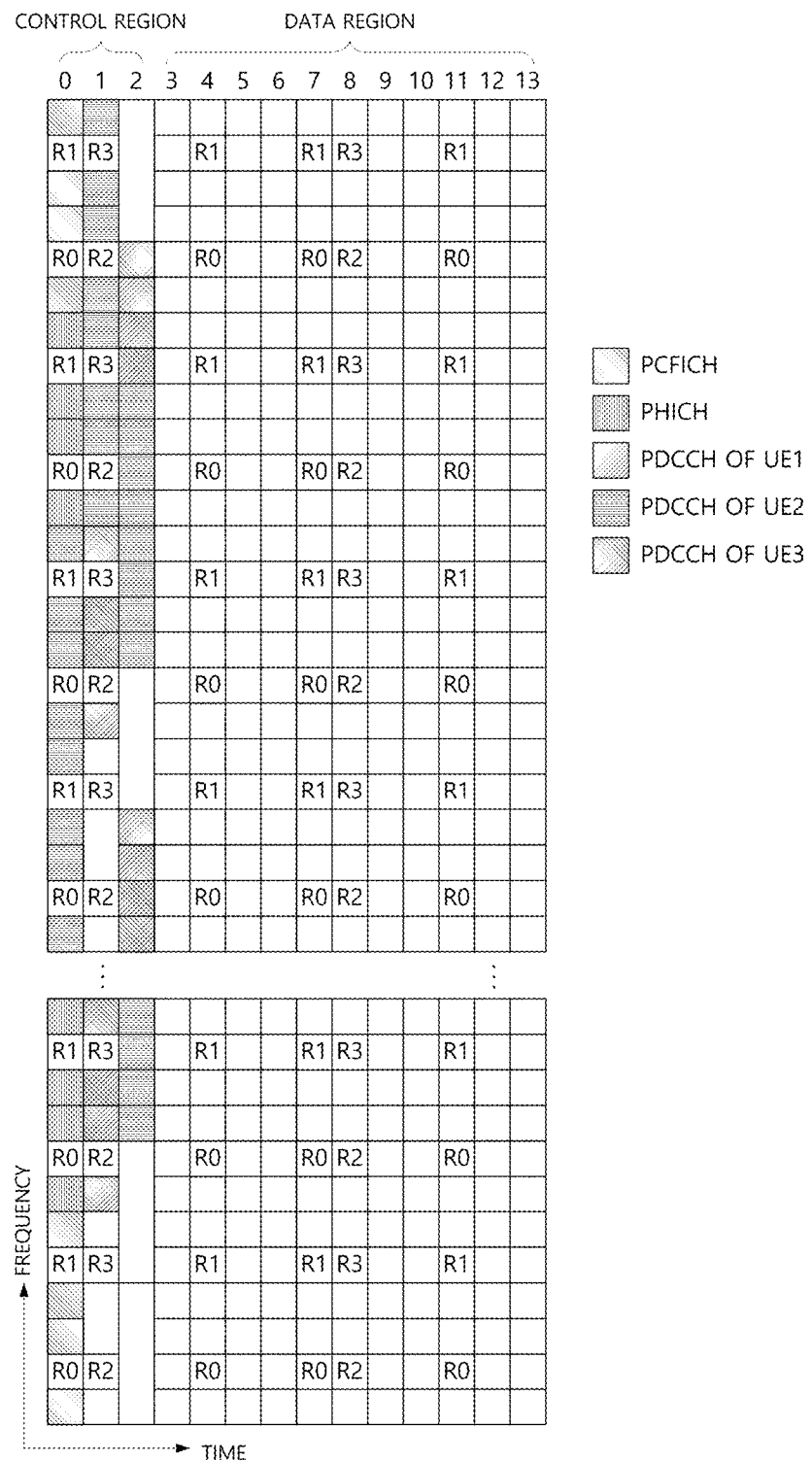
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
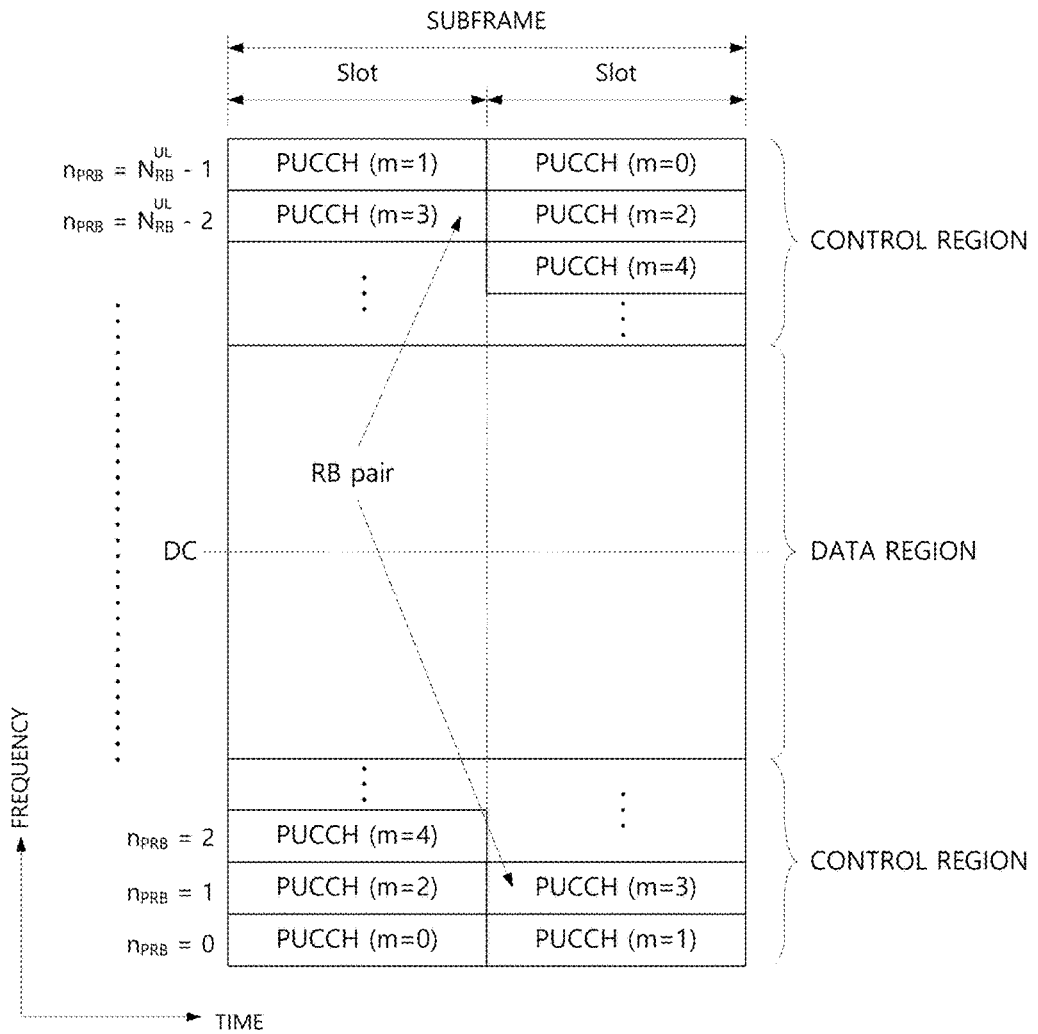
FIG. 5 illustrates a structure of an uplink subframe.

FIG. 5 illustrates a structure of an uplink subframe.

Referring to FIG. 5, the subframe may be divided into the control region and the data region in the frequency domain.

The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
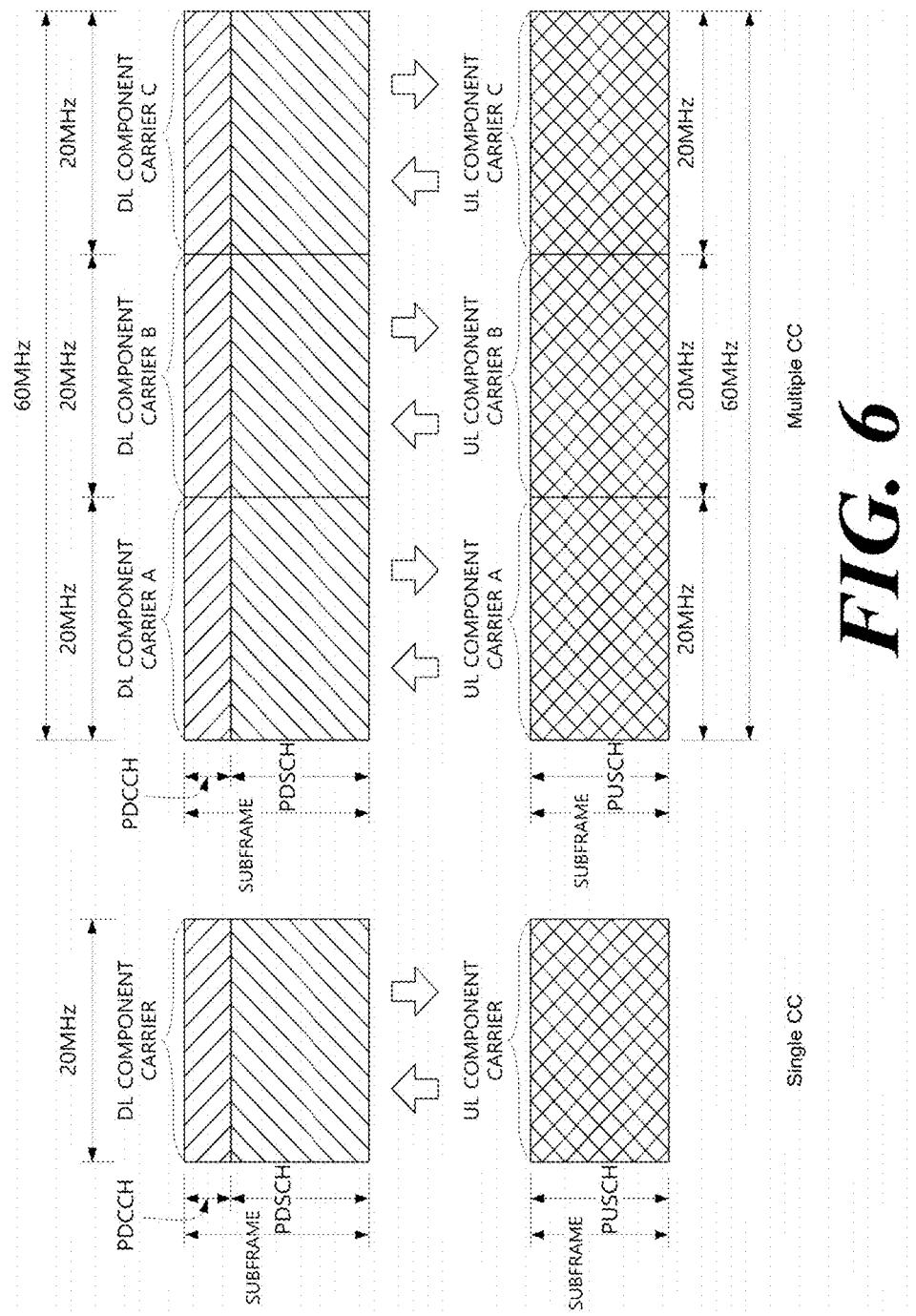
FIG. 6 is a diagram for describing single carrier communication and multi-carrier communication.

FIG. 6 is a diagram for describing single carrier communication and multi-carrier communication. FIG. 6A illustrates a subframe structure of a single carrier and FIG. 6B illustrates a subframe structure of multi-carriers which are carrier-aggregated.

Referring to FIG. 6A, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6B, the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6B, three 20 MHz CCs are gathered in each of the UL and the DL to support a bandwidth of 60 MHz. The CCs may be adjacent to each other or non-adjacent to each other in the frequency domain. For convenience, FIG. 6B illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
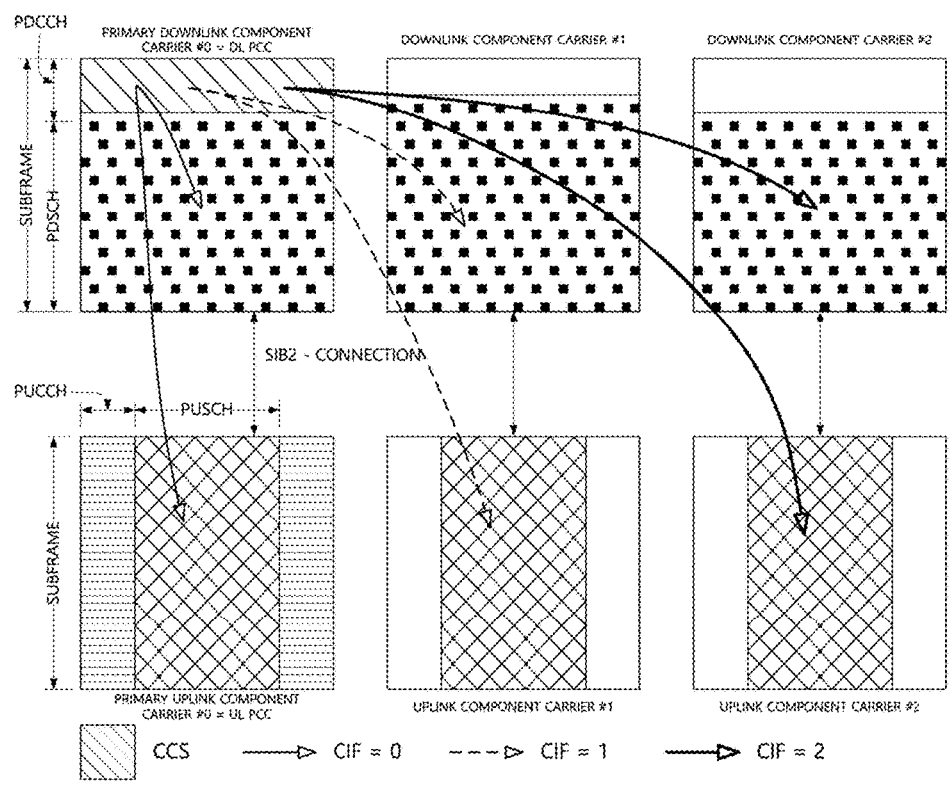
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
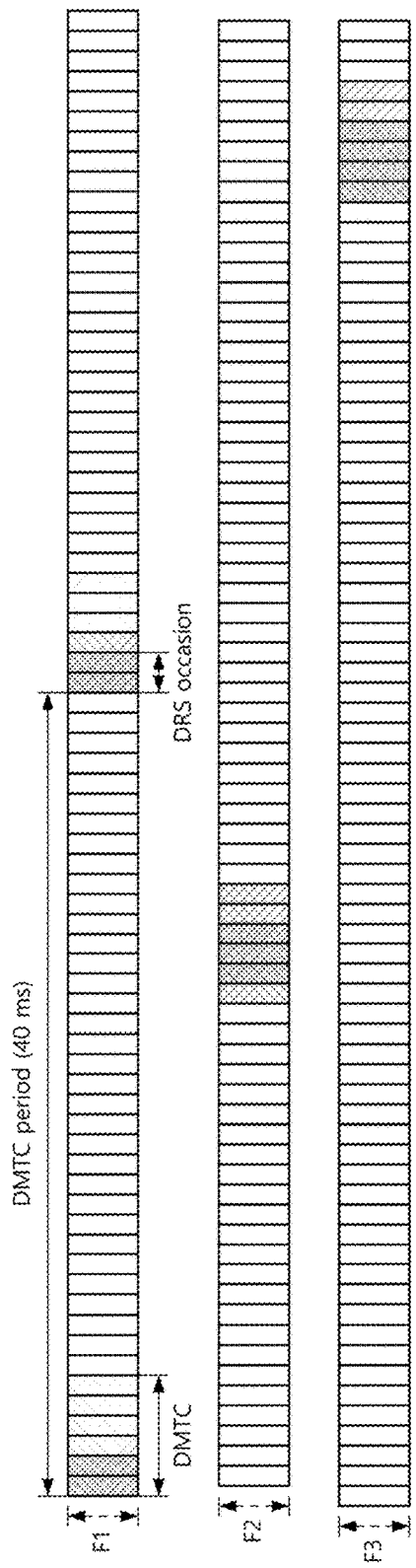
FIG. 8 illustrates Discovery Reference Signal (DRS) transmission.
Figure 9:
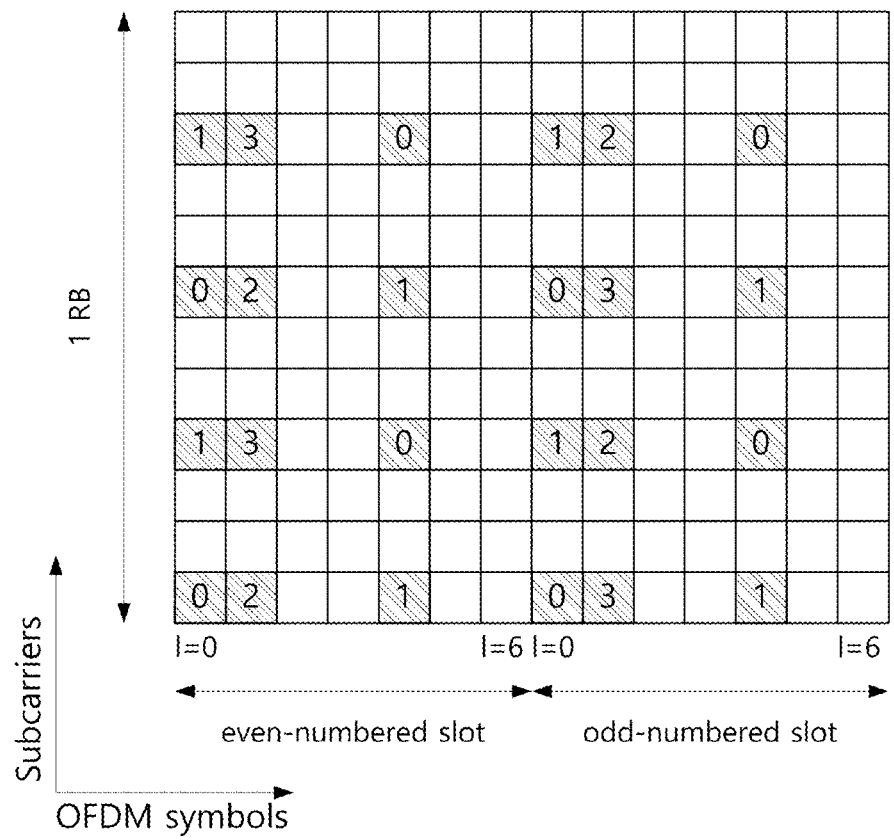
FIGS. 9 to 11 illustrate the structure of a reference signal used as DRS.
Figure 10:
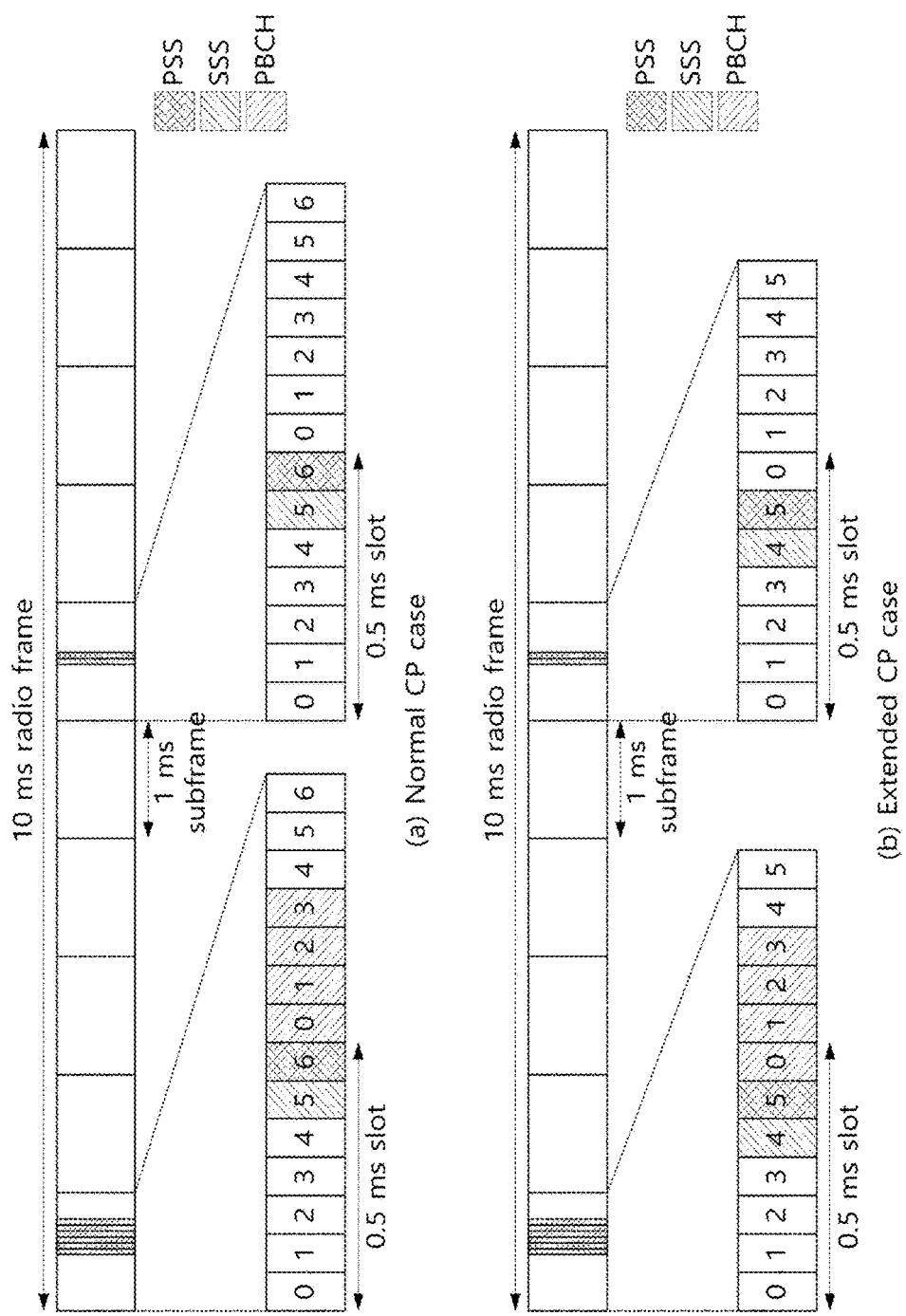
Figure 11:
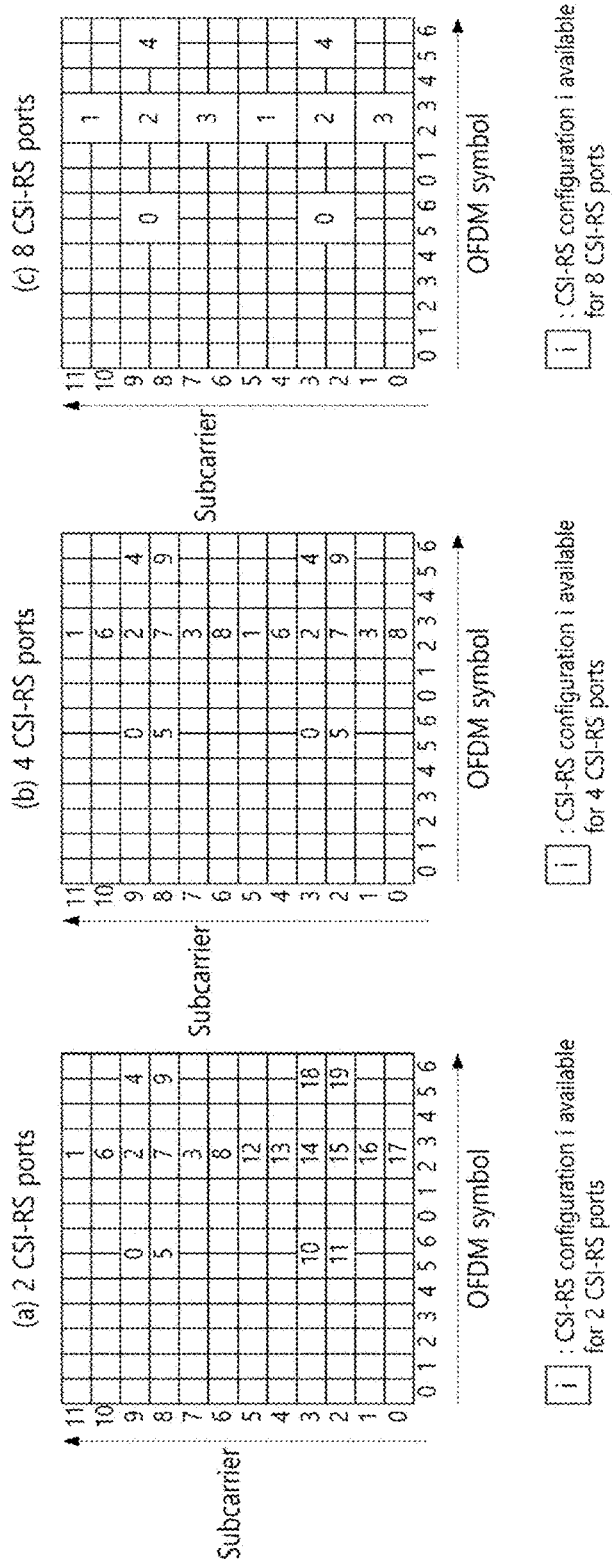

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

- Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.
- Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
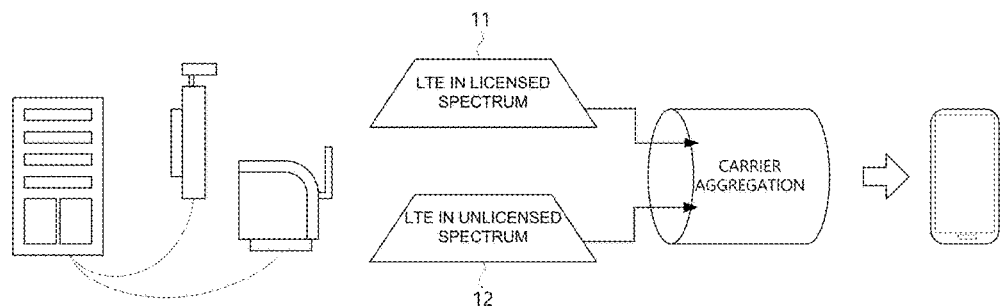
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
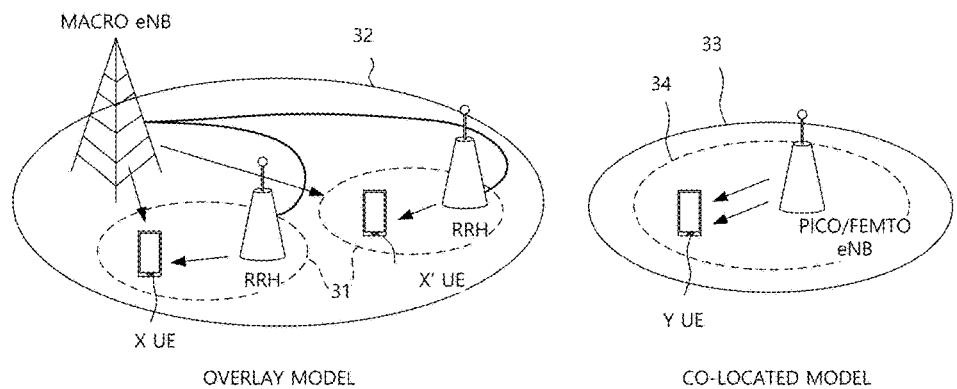
FIG. 13 illustrates a deployment scenario of a user equipment and a base station in an LAA service environment.

FIG. 13 illustrates a deployment scenario of a user equipment and a base station in an LAA service environment.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 14:
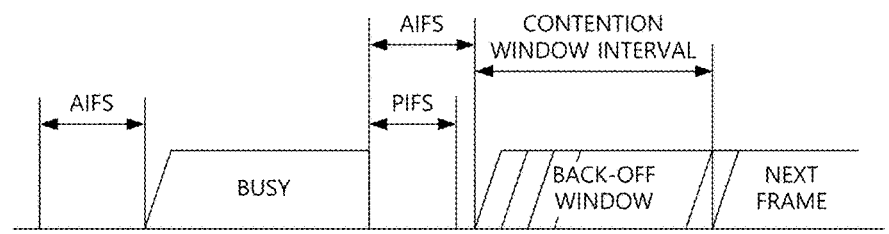
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer period (e.g., arbitration interframe space (AIFS), PCF IFS (PIFS), or the like). The defer period means a minimum time when the terminal needs to wait after the channel is idle. The backoff procedure allows the terminal to further wait for a predetermined time after the defer period. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
An LBT procedure by a Tx entity is not performed.

Category 2: LBT without random backoff
A time interval in which the channel needs to be sensed in an idle state before the Tx entity performs a transmission on the channel is decided. The random backoff is not performed.

Category 3: LBT with random backoff with a CW of fixed size
LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4: LBT with random backoff with a CW of variable size
LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
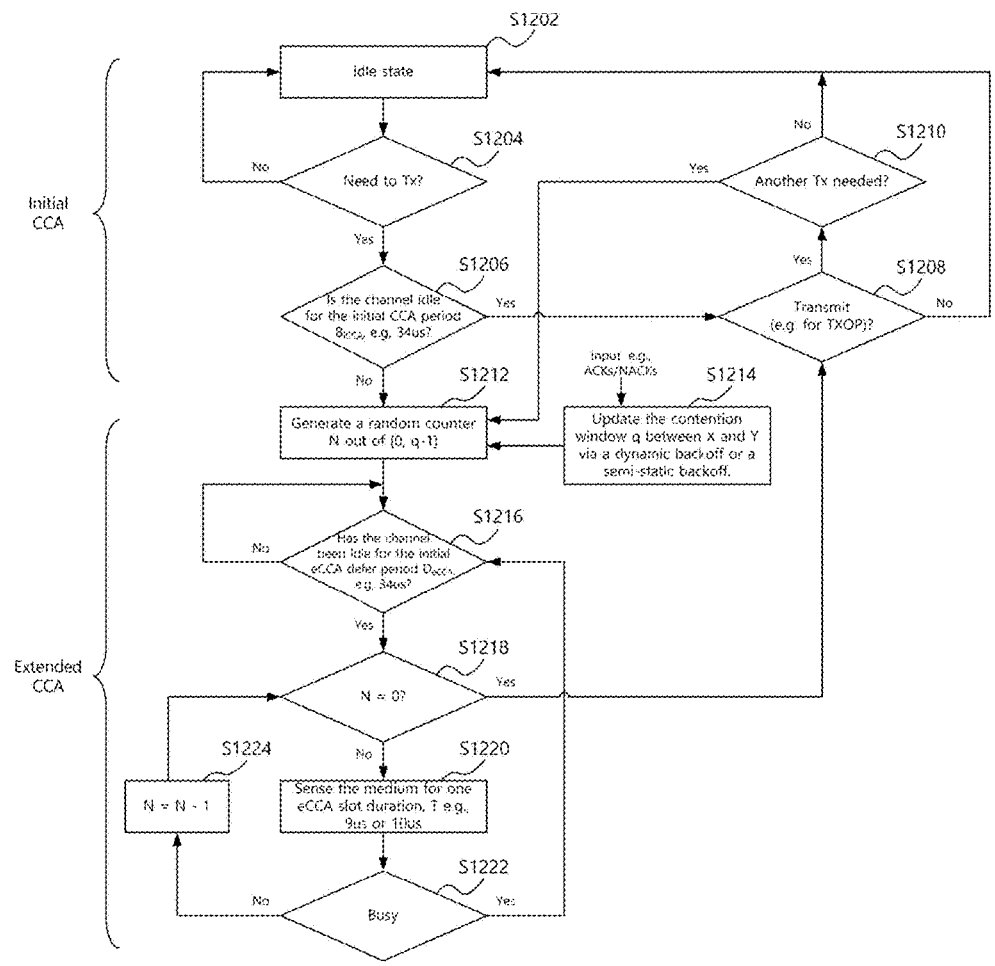
FIGS. 15 and 16 illustrate a Listen-Before-Talk (LBT) procedure for DL transmission.
Figure 16:
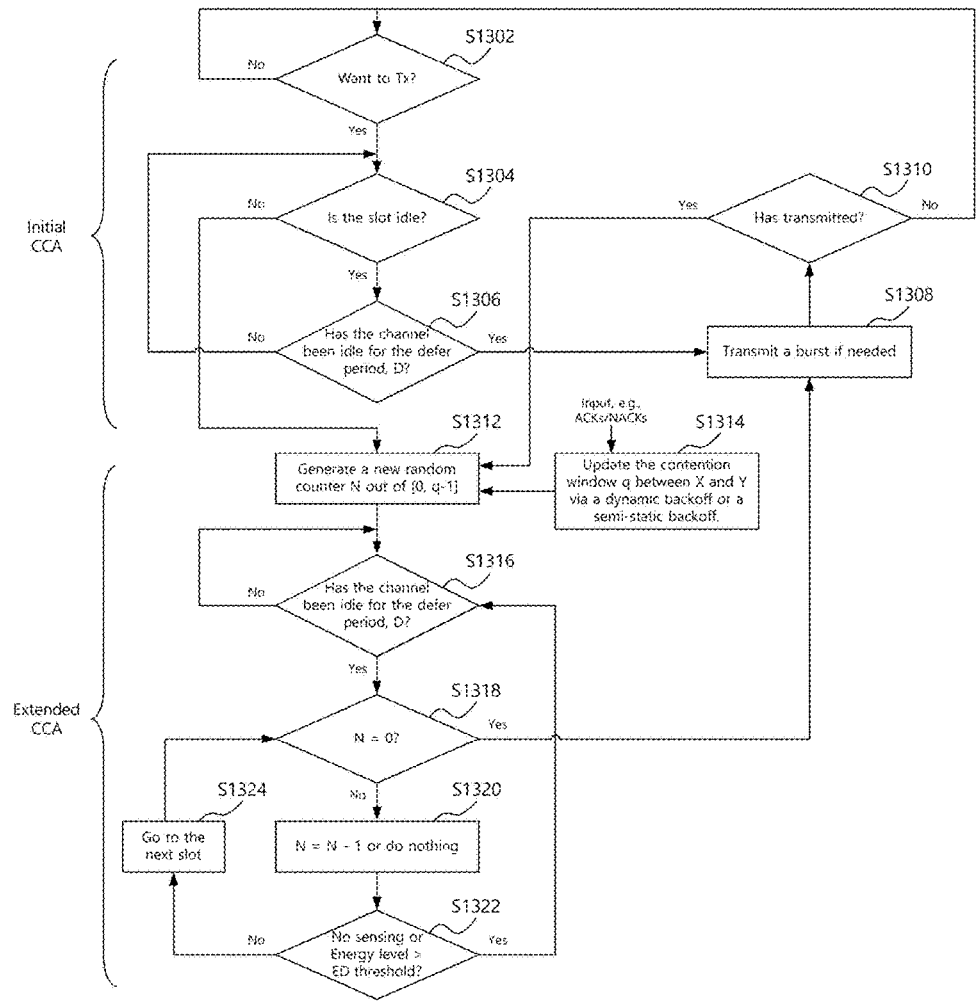

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer period+backoff counter after setting a random backoff counter.

Referring to FIG. 15, the signal transmission process may be performed as follows.

Initial CCA

S1202: The base station verifies that the channel is idle.

S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period ($B_{CCA}$). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a backoff counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA

S1212: The base station generates the random number N in the CW. N is used as a counter during the backoff process and generated from [0, q−1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic backoff) and semi-statically performed at a predetermined time interval (semi-static backoff). The CWS may be updated/adjusted based on exponential backoff or binary backoff. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4 μs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 16 is substantially the same as/similar to the transmission process of FIG. 15 and differs according to the implementation method. Therefore, the details may refer to the contents of FIG. 15.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 15.

S1306: The base station verifies whether the channel is idle for a defer period (D). D may correspond to the ICCA defer period in FIG. 15. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the backoff counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the backoff process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic backoff) and semi-statically performed at a predetermined time interval (semi-static backoff). The CWS may be updated/adjusted based on exponential backoff or binary backoff. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 15. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

Figure 17:
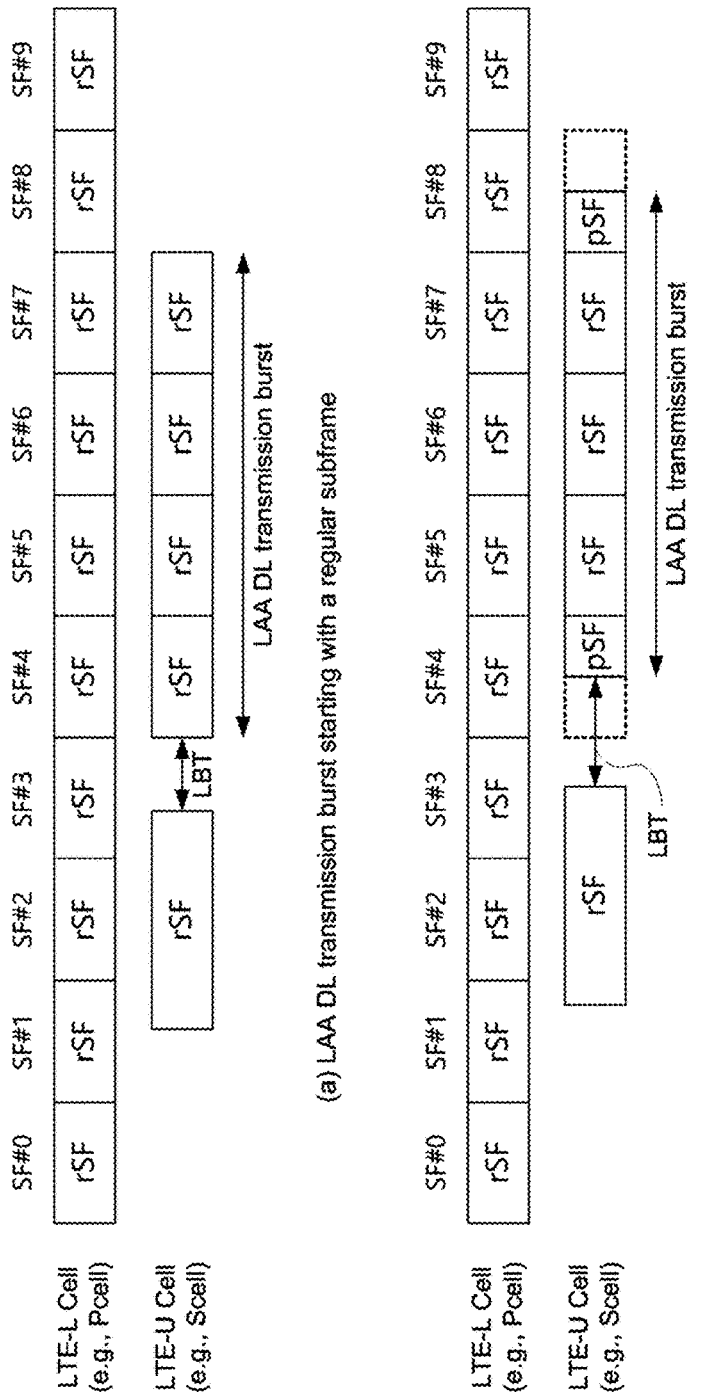
FIG. 17 illustrates DL transmission in an unlicensed band.

FIG. 17 shows an example in which a base station performs DL transmission in an unlicensed band. The base station may aggregate cells (for convenience, LTE-L cell) of one or more licensed bands and cells (for convenience, LTE-U cell) of one or more unlicensed bands. FIG. 17 assumes that one LTE-L cell and one LTE-U cell are aggregated for communication with a user equipment.

The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the DL transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The DL transmission burst may start as the regular subframe (rSF) or a partial subframe (pSF) according to an LBT situation. pSF may be a part of the subframe and may include a second slot of the subframe. Further, the DL transmission burst may end as rSF or pSF.

Hereinafter, DRS transmission in an unlicensed band will be described. Using Rel-12 DRS on carriers within the unlicensed band introduces new limitations. LBT regulation in some areas treats DRS as a short control transmission, allowing DRS transmission without LBT. However, in some areas (such as Japan), LBT is also required for short control transmissions. Therefore, it is required to apply the LBT to the DRS transmission on the LAA SCELL.

Figure 18:
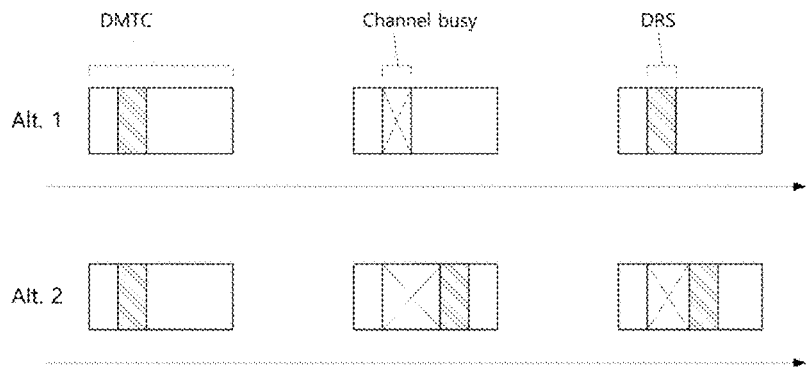
FIG. 18 illustrates DRS transmission in an unlicensed band.

FIG. 18 illustrates DRS transmission in an unlicensed band. When LBT is applied to DRS transmission, DRS may not be periodically transmitted due to LBT failure in the unlicensed band, unlike Rel-12 DRS transmitted in the licensed band. If the DRS transmission fails within the DMTC, the following two options may be considered.

Alt1: The DRS may only be transmitted at a fixed time position within the DMTC. Therefore, if the DRS transmission fails, there is no DRS transmission in the DMTC.

Alt2: The DRS may be transmitted in at least one other time position within the DMTC. Thus, if a DRS transmission fails, a DRS transmission may be attempted at another time position within the DMTC.

Hereinafter, a DRS transmission method in an unlicensed band will be described. Specifically, a parameter for DRS transmission suitable for LAA based on DRS of 3GPP LTE Rel-12, a DRS transmission method, and the like are suggested. For convenience, DRS in the existing licensed band is referred to as Rel-12 DRS or LTE-L DRS, and DRS in the unlicensed band is referred to as LAA DRS or LTE-U DRS.

Figure 19:
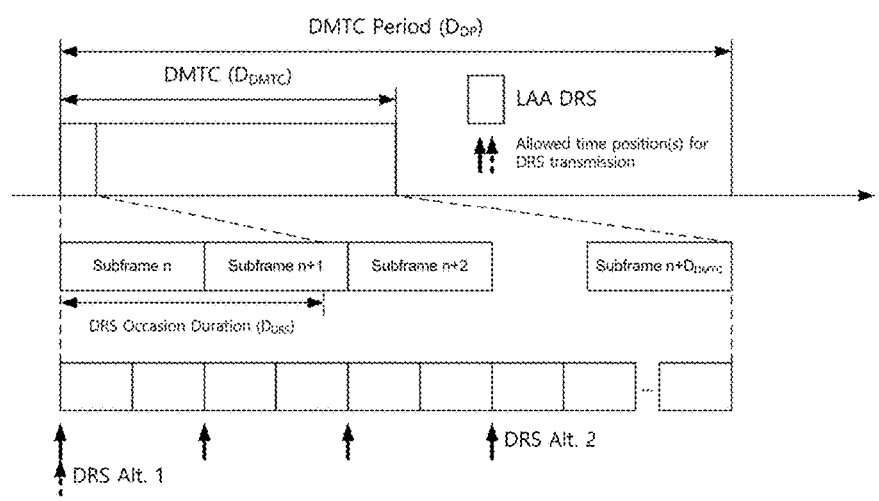
FIG. 19 illustrates a parameter for LAA DRS transmission and a DRS transmission method based on LBT.

FIG. 19 illustrates a parameter for LAA DRS transmission and a DRS transmission method based on LBT. The DRS transmission period is set by the DMTC, and the DMTC period in the Rel-12 DRS is set to 40/80/160 ms (see FIG. 8). However, if the channel of the transmission time point is busy due to the peripheral interference or the like in the case of the DRS transmitted in the LAA based on the LBT, the DRS may not be transmitted according to the DRS transmission period. Therefore, if the DMTC period is set to the same as that in the LAA DRS, the transmission frequency of the LAA DRS may be lowered. Therefore, a new DMTC period is required in the LAA, and may be set to 40 ms or less, for example. In addition, the base station may attempt to transmit DRS at least once within the DMTC period, and may set a duration such as the DMTC and may be set to transmit DRS in the corresponding duration. Accordingly, since the user equipment expects DRS transmission only in the DMTC, DRS search/detection is performed only in the corresponding DMTC, thereby reducing the power consumption of the user equipment and the burden of blind detection/decoding. When a DRS transmission occurs in the DMTC, the base station transmits a DRS configuration (e.g., a configuration with CRS/PSS/SSS/CSI-RS in Rel-12) if the channel is idle after LBT. DRS transmission duration may be defined as DRS occasion duration. The DRS occasion duration in Rel-12 may be set to 1 to 5 ms. Since LAA operates based on LBT, as the DRS length (=DRS occasion duration) becomes longer, the transmittable time point decreases, and in the case of long DRS, continuous transmission is required so that idle duration does not occur in order to prevent the transmission of other base stations/user equipments/Wi-Fi devices based on LBT. FIG. 19 shows a DRS occasion duration having a length of at least one subframe for convenience, but the length of the DRS occasion duration is not limited thereto. A method of transmitting DRS after LBT is largely classified into two. There are an Alt1 (DRS Alt. 1) technique, which allows transmission from a fixed position (for convenience, the DMTC starting position) in the DMTC based on the LBT, and an Alt2 (DRS Alt. 2) technique, which allows at least one other DRS transmission even if the DRS transmission fails because the CCA result channel is busy in the DMTC.

Figure 20:
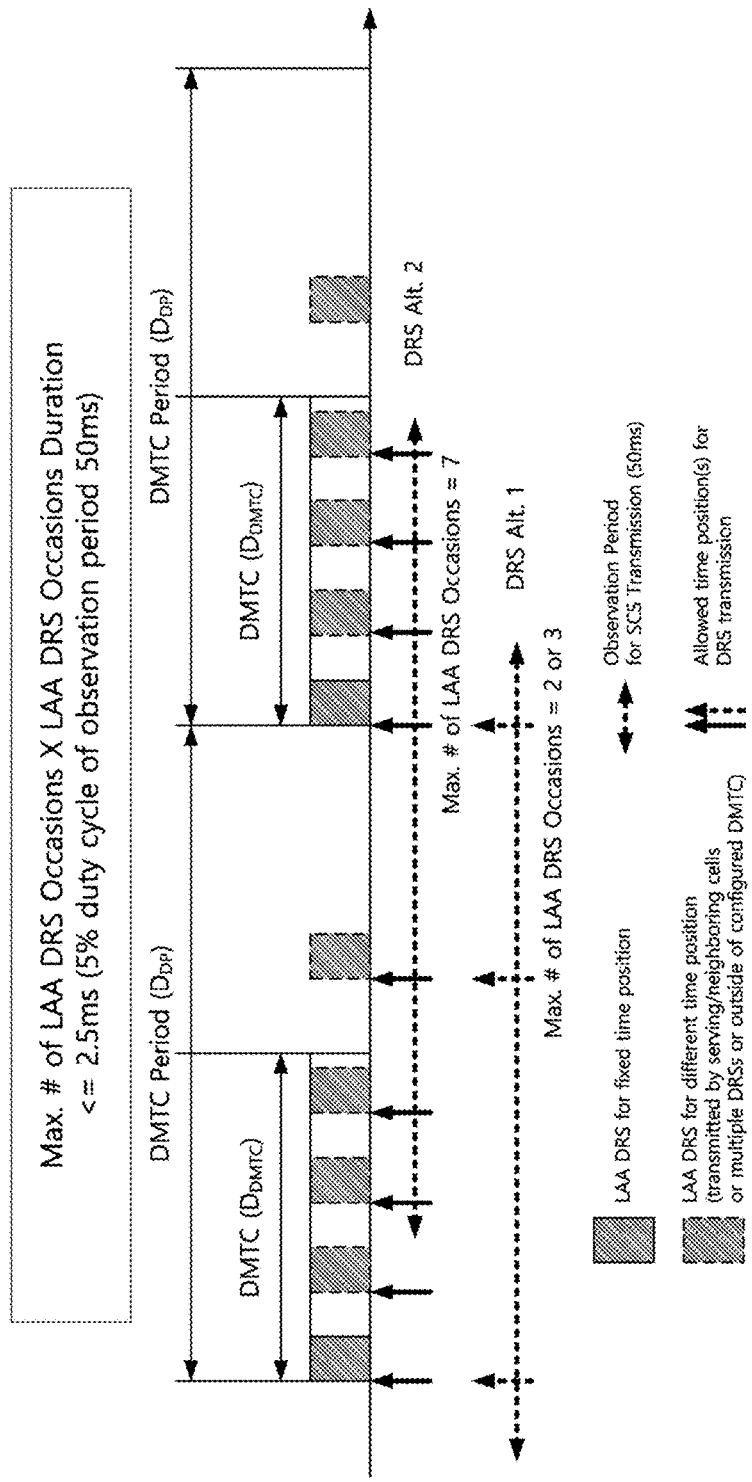
FIG. 20 illustrates a periodic/non-periodic DRS and opportunistic DRS transmission scheme.

FIG. 20 illustrates a periodic/non-periodic DRS and opportunistic DRS transmission scheme. The LAA DRS may transmit DRS based on LBT in the idle channel after performing CCA. However, as defined in ETSI Standard EN 301 893, the Short Control Signal (SCS) may be transmitted regardless of the CCA result (LBT Exempt transmission). Here, the SCS length is set so as not to exceed a maximum 5% duty cycle within a 50 ms observation duration (observation period/time). That is, a control signal of 2.5 ms or less within 50 ms may be transmitted without LBT. In the region such as Japan, LBT performance is restricted for all transmission signals, but in areas that allow LBT Exempt SCS transmission like ETSI, a signal design that may coexist in such different regulations is needed when transmitting LAA DRS. Referring to FIG. 20, in the case of DRS Alt. 1, the maximum number of LAA DRS occasions transmittable in a 50 ms observation duration for SCS transmissions is 2 or 3 (assuming that a DMTC period is 40 ms). Specifically, if the DRS transmitted at a fixed time point in the DMTC is an SCS, the DRS may be periodically transmitted according to the DMTC period within 50 ms without LBT. At this time, the number of DRS occasions may be determined as ceiling (Observation time duration/LAA DRS occasion Duration=50/40)=2. Also, if non-periodic DRS is allowed and LBT-Exempt transmission is performed, non-periodic DRS transmission within observation duration should also be considered. Thus, in FIG. 20, up to 2 or 3 DRS occasions may be determined considering periodic (+non-periodic) DRS. Assuming the maximum of three DRS occasions, it is desirable to design the DRS occasion duration to be less than the maximum of 0.8 ms at 3*DRS occasion duration <=2.5 ms. In the case of DRS Alt. 2, DRS transmission is possible at one or more other time positions within the DMTC, and in the case of LBT Exempt, DRS may be transmitted at a specific time point. Also, if it is possible to transmit more than one DRS, a plurality of DRS transmissions may be made within the DMTC. For example, a plurality of DRS occasions may occur, including DRS transmissions of neighboring cells as well as serving cells. In this case, a plurality of DRS transmissions may need to be considered in the provision for LBT Exempt transmissions. Furthermore, if DRS transmissions are possible outside the DMTC through non-periodic DRS transmissions, it is desirable to design such that the sum of the maximum DRS occasion durations in the observation duration does not exceed a maximum of 5% duty cycle. In FIG. 20, it is assumed that a total of 7 DRS occasions occur, and DRS Alt. 2 should be 7*DRS occasion duration <=2.5 ms. Therefore, the DRS occasion duration should be designed to approximately 0.357 ms.

As an example, the LAA DRS occasion duration may be designed to satisfy the following equation.

$$\text{Max. \# of LAA DRS occasions} \times \text{LAA DRS occasion Duration} <= 2.5 \text{ ms (5\% duty cycle of observation period 50 ms)} \quad \text{[Equation 1]}$$

Here, the DRS occasion duration is in a fixed form and may vary depending on the DRS component (e.g., CRS/PSS/SSS/CSI-RS+others).

Although FIG. 20 assumes a fixed single DRS length, the DRS length should be designed or adjusted in a scheduling/configuration such that the sum of the maximum DRS occasion durations during the observation duration does not exceed a maximum of 5% duty cycle for the variable DRS length.

In addition, SCS-based LBT-Exempt DRS transmissions do not perform LBT and thus are to provide or receive interference to or from the vicinity. Therefore, RRM measurement using LBT-Exempt DRS and RRM measurement using LBT-based DRS have different results. Accordingly, it is desirable that the user equipment knows whether the corresponding DRS is an LBT-Exempt DRS or an LBT-based DRS, and in consideration of this, transmits the RRM measurement report to the BS. For this, it is necessary to indicate whether the RRM measurement report is based on either LBT-Exempt DRS or LBT-based DRS. Furthermore, since additional information and RS information are expected to have a performance difference in consideration of LBT-Exempt DRS and LBT-based DRS, it is also possible to design a different DRS format according to an LBT-Exempt scheme and an LBT scheme.

Figure 21:
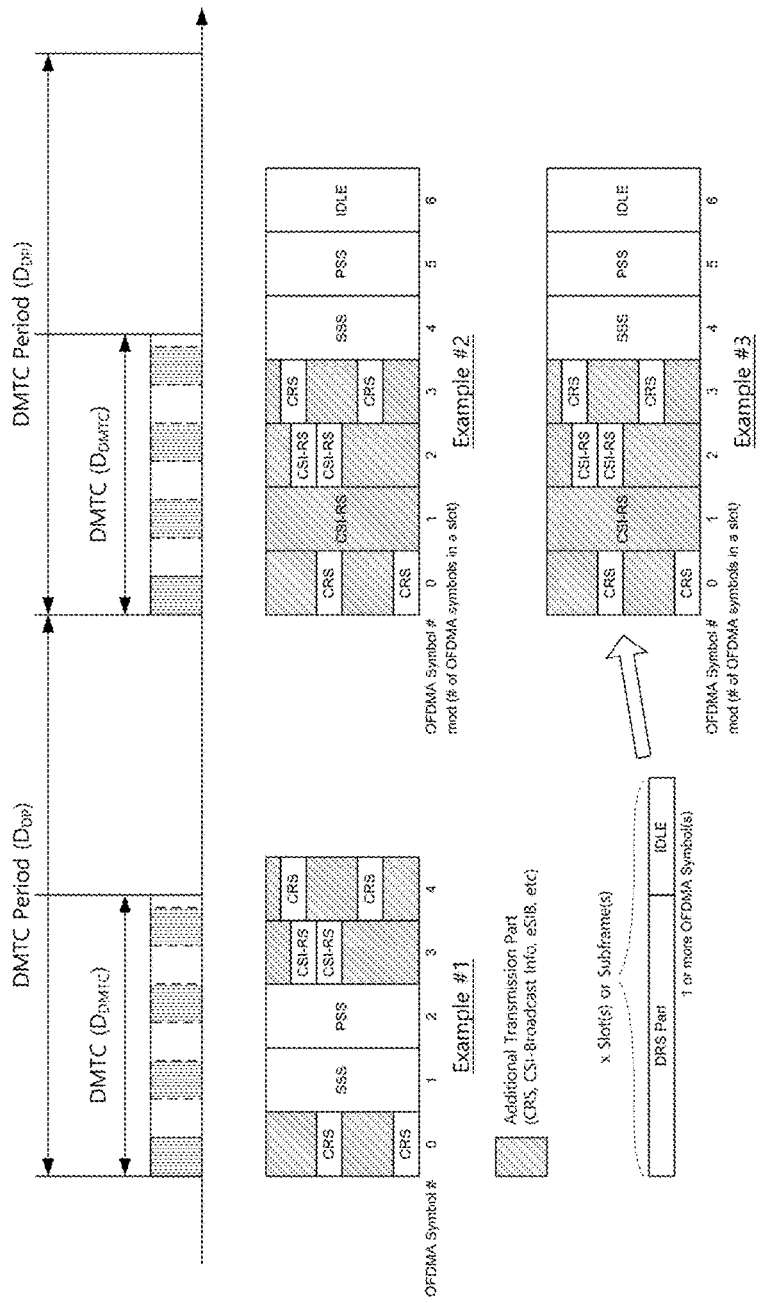
FIG. 21 illustrates an example of designing LAA DRS.

FIG. 21 illustrates a structure of an LAA DRS. In the case of LAA DRS that performs RRM measurement and time/frequency synchronization, it may transmit CRS, PSS/SSS, CSI-RS, etc. in a similar manner to Rel-12 DRS. However, unlike Rel-12 DRS, in the case of LAA DRS, LBT is performed and due to this, two transmission requirements are mainly generated.

DRS supports one-shot RRM measurement: In order to perform multi-shot measurement on the DRS transmitted after the LBT, a plurality of DRS transmissions should be guaranteed. It is difficult to derive a reliable measurement result (for example, a reference signal received power (RSRP)/a reference signal received quality (RSRQ)) if the DRS may not be transmitted within a limited time. Thus, it is desirable that the LAA DRS is designed to capable of performing DRS measurements by one-shot through additional RS or repeated transmission. Here, one shot corresponds to one DRS occasion.

Continuous Transmission: If a Rel-12 DRS structure is used in the LBT-based LAA DRS transmission, durations other than CRS, PSS/SSS, and CSI-RS transmissions may be transmitted as idle OFDM symbols. Therefore, if the Rel-12 DRS structure is used in the LAA, even if the DRS is transmitted through the LBT process, other peripheral devices perform transmission in the middle of the DRS based on the LBT, so that DRS transmission is impossible or RRM measurement/synchronization performance may be degraded. Therefore, it is desirable that the LAA DRS structure is composed of continuous OFDM symbol transmissions.

Subframe/slot alignment: LBT-based DRS may be defined by reusing existing Rel-12 DRSs (CRS, PSS/SSS, and CSI-RS). Therefore, even if the complexity of the base station and the user equipment is not increased by reusing existing implementation algorithms and the like, and data and DRS are mixed at the transmission time point, it is desirable to define DRS occasions in subframe or slot units in order to transmit DRS.

Thus, the LAA DRS has different requirements from the Rel-12 DRS, and in consideration of this, an example of designing the LAA DRS is shown in FIG. 21. Example 1 shows that the transmission position maintains an existing form as much as possible in order to configure the DRS of a minimum length and to provide the implementation reuse of existing CRS, PSS/SSS, and CSI-RS. Referring to Example 1, the position of CRS port 0 is fixed, and a compact LAA DRS may be configured to transmit the synchronization signal and the CSI-RS to the originally empty OFDM symbol 1/2/3. Furthermore, when data demodulation is performed based on the CRS, the corresponding information/signal may be transmitted in a specific symbol as shown in the drawing (additional transmission part). Example 2 shows a one-slot structure to maintain DRS occasion durations in the form of a slot/subframe. In the case of the LAA DRS for transmitting additional information or RS, it is advantageous to transmit additional information or RS (additional transmission part) in some or all OFDM symbols 0 to 4 when considering channel estimation for CRS-based additional information demodulation. Since the channel of the neighboring subcarrier is estimated using the channel information obtained based on the CRS position in the CRS-based channel estimation process, it is desirable to transmit additional information or RS to the same position as in Example 2. Also, since the last ⅝th OFDM symbol in the slot structure is originally transmitted at the PSS/SSS position, the base station may perform not only DRS but also general synchronization channel transmission at the same time. When considering LBT-based LAA DRS transmission time points in slot/subframe units, Example 3 may set the CCA allowed duration so that other data transmissions after the DRS transmission match the slot/subframe boundary. For this, the last part of the slot/subframe for transmitting the DRS (e.g., the last OFDM symbol) may be set to an idle state. As in Example 3, the last part of the slot/subframe (e.g., the last OFDM symbol) may be set to an idle state to induce the peripheral device to perform transmission in correspondence to the subframe boundary. On the other hand, in the case of Rel-12 DRS, when the CSI-RS is transmitted as the DRS, the signal is transmitted until the last OFDM symbol of the subframe. Therefore, when a base station configures a subframe including a CSI-RS as a DRS, the configuration of a subframe varies depending on whether DRS is Rel-12 DRS or LAA DRS. That is, the configuration of the DRS transmission subframe is changed according to the DRS type (i.e., Rel-12 DRS or LAA DRS) or the type of the cell in which the DRS is transmitted (i.e., LCell or UCell). Specifically, when the DRS is Rel-12 DRS, the CSI-RS may be configured to the end of the subframe as shown in FIG. 11. On the other hand, when the DRS is LAA DRS, the CSI-RS may not be configured until the end of the subframe, and the end of the subframe (e.g., the last OFDM symbol) is set to an idle state.

Figure 22:
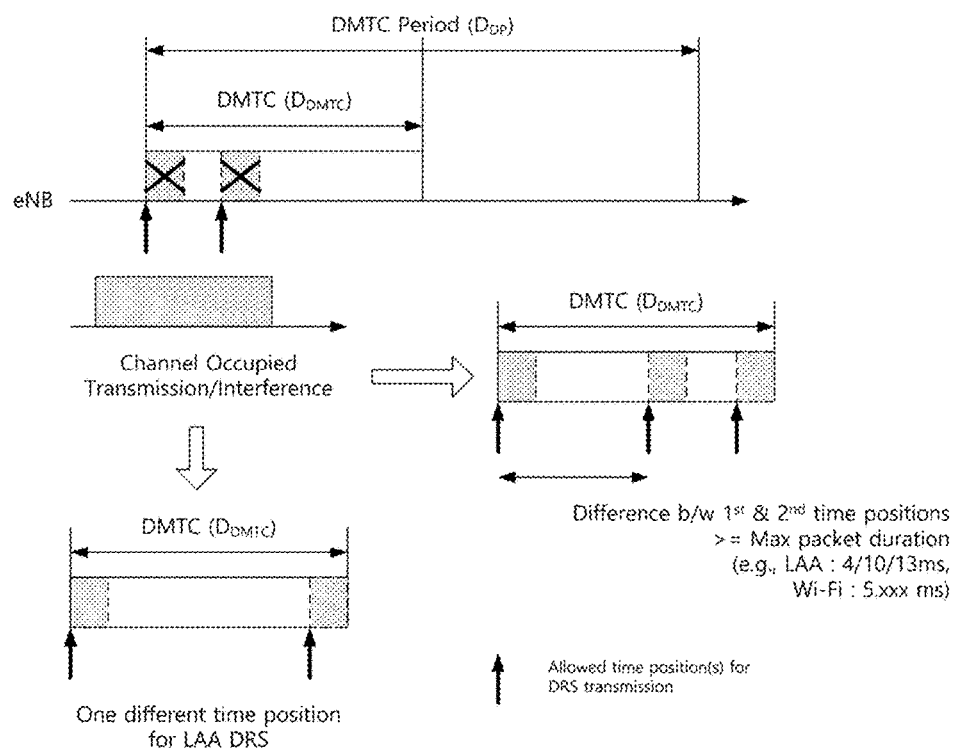
FIG. 22 shows an example of defining one additional transmission time point in DMTC.

FIG. 22 shows an example of defining one additional transmission time point in DMTC. When assume that there are two transmittable time points in the DMTC as shown in FIG. 22, in the case of LBT-based DRS, if CCA is not successfully performed at the first time position, it is determined that the corresponding time point is busy, so that the CCA is performed at the next defined time position. As shown in the drawing, if the same channel is already occupied in the vicinity, or an interference signal is generated using the same channel in another communication method, the CCA for DRS transmission in the DMTC of the base station may fail at the first time point. At this time, if the second defined time position is still affected by interference or occupancy signals as in the drawing, all DRS transmission time points within the DMTC are lost. If the CCA fails at the first transmission time point of the DRS in such a way, a neighboring specific data packet may be transmitted through the LAA or Wi-Fi, and if the second time position is defined at the fast time point, due to continuous CCA failures, the DRS transmission fails until the next DMTC period. Thus, when defining a new time position, it is desirable to define the latter part in the DMTC, and it may be designed to define an additional time position for LAA DRS transmission after ½*DMTC thereby avoiding transmission of neighboring data packets as much as possible and exactly allowing DRS transmissions within the DMTC. Although two DRS time positions are illustrated for convenience, for two or more DRS time positions, the interval between the first DRS time position and the second DRS time position may be set considering the LAA or Wi-Fi maximum packet length. This is because it is possible to secure a DRS transmission opportunity after completion of packet transmission considering the length of the neighboring packet.

Figure 23:
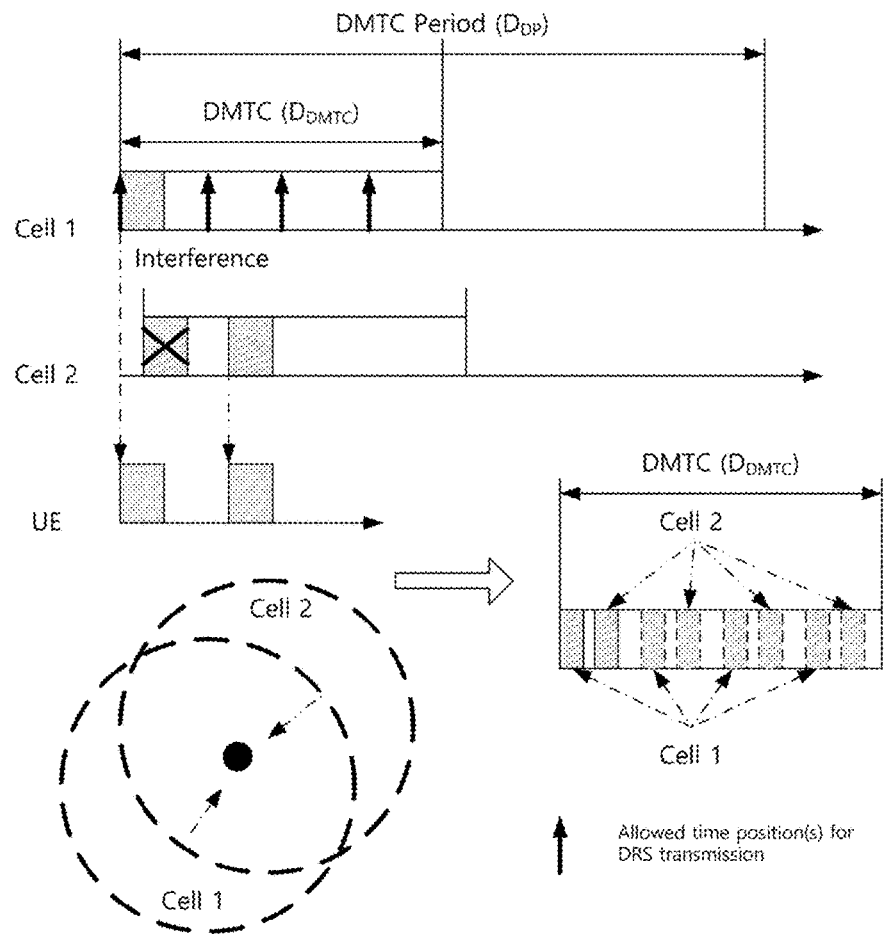
FIG. 23 shows an example of receiving DRS from two cells for RRM measurement for a neighboring cell.

FIG. 23 shows an example of receiving DRS from two cells for RRM measurement for a neighboring cell. When it is possible to receive DRS from a plurality of cells, a user equipment needs to distinguish from which cell the DRS received at a specific time point is received. However, it is difficult to guarantee the inter-cell synchronization at all times, and since a user equipment performs coarse synchronization at the DRS reception time point in general, it is difficult to assure accurate time points and propagation delays co-exist. Due to this, as shown in the drawing, due to the DRS transmitted from cell 1, the DRS transmission opportunity in the DMTC may not be acquired in cell 2. In order to overcome this problem, by setting a plurality of time opportunities within the DMTC and dividing them by cells, a user equipment may smoothly perform the RRM measurement using the DRS of the serving/neighboring cells at a predetermined time point. Furthermore, as shown in the drawing, the time position candidates classified in the TDM format may be considered, and the inter-cell distinction may be possible by a combination of the various time position candidates. For example, in order to obtain inter-cell time position, a time position may be set using a function of a physical cell Identifier (ID) and a Public Land Mobile Network (PLMN) ID, thereby facilitating inter-cell distinction.

Figure 24:
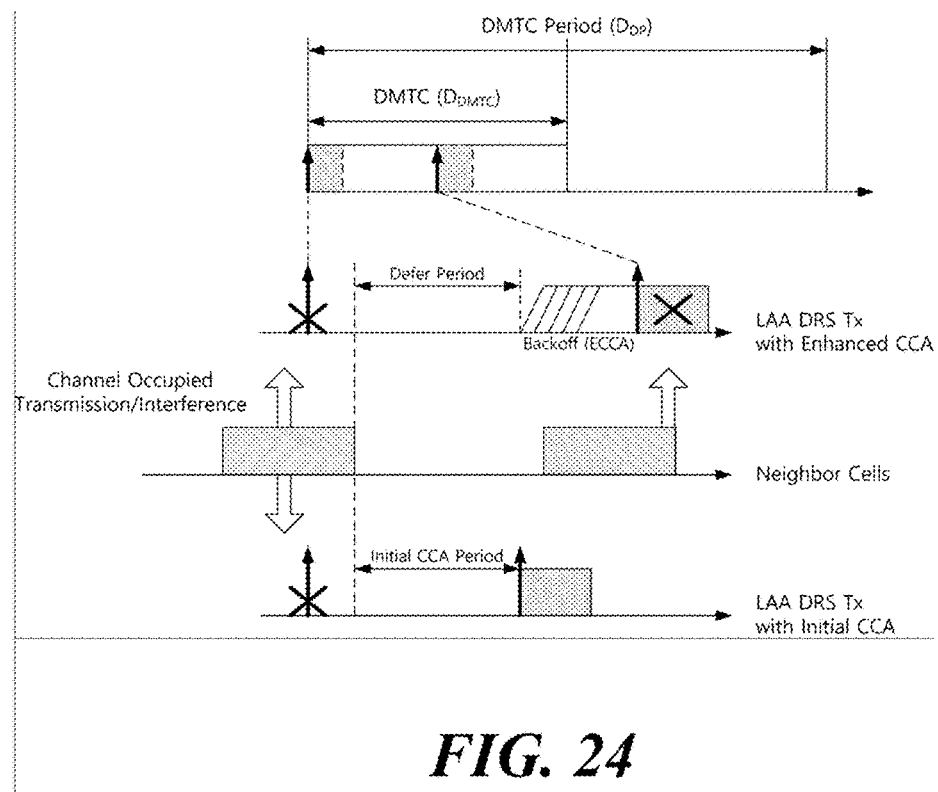
FIGS. 24 and 25 illustrate a CCA operation for LBT-based DRS transmissions.

FIG. 24 illustrates a CCA operation for LBT-based DRS transmissions. This example may be limited to the case where a DL transmission process based on category 4 LBT is set. Referring to FIG. 24, if the DRS transmission fails because the channel is busy at the initial transmission time point in the DMTC, a base station may acquire an idle channel state through a new CCA process in the DMTC and transmit it to the DRS. At this time, if an interference signal in the vicinity is detected and it is determined that the channel is being used, an operation is performed with an extended CCA (ECCA) that performs a defer period and a backoff operation, and in this case, a DRS transmission serving base station may simultaneously compete with other user equipments and base stations in the vicinity, and since DRS without any special competitive advantage is transmitted through the same contention as data transmission, it may be difficult for the user equipment to periodically receive the DRS. Accordingly, in the present invention, it is possible to determine whether DRS transmission is performed only in the ICCA period, not in the ECCA, during the LAA DRS transmission. That is, if the channel is idle during a single interval duration, DRS may be transmitted. In addition, even if the DRS may not be transmitted because the channel is busy at the initial time position for transmission of the DRS during the LAA DRS transmission, it is possible to determine whether or not to transmit the DRS using only the ICCA period instead of the ECCA. That is, if the signal transmission fails because the channel is busy, the backoff operation may be applied to the non-DRS signal (e.g., data) according to the ECCA, and the ICCA may be applied to the DRS signal to exclude the backoff operation. Thus, DRS transmissions may be transmitted with comparative advantage compared to neighboring data transmissions. Or, a parameter for determining a backoff counter may be adjusted so that the serving base station may secure resources faster than the neighboring user equipment/base station and transmit the DRS first.

Figure 25:
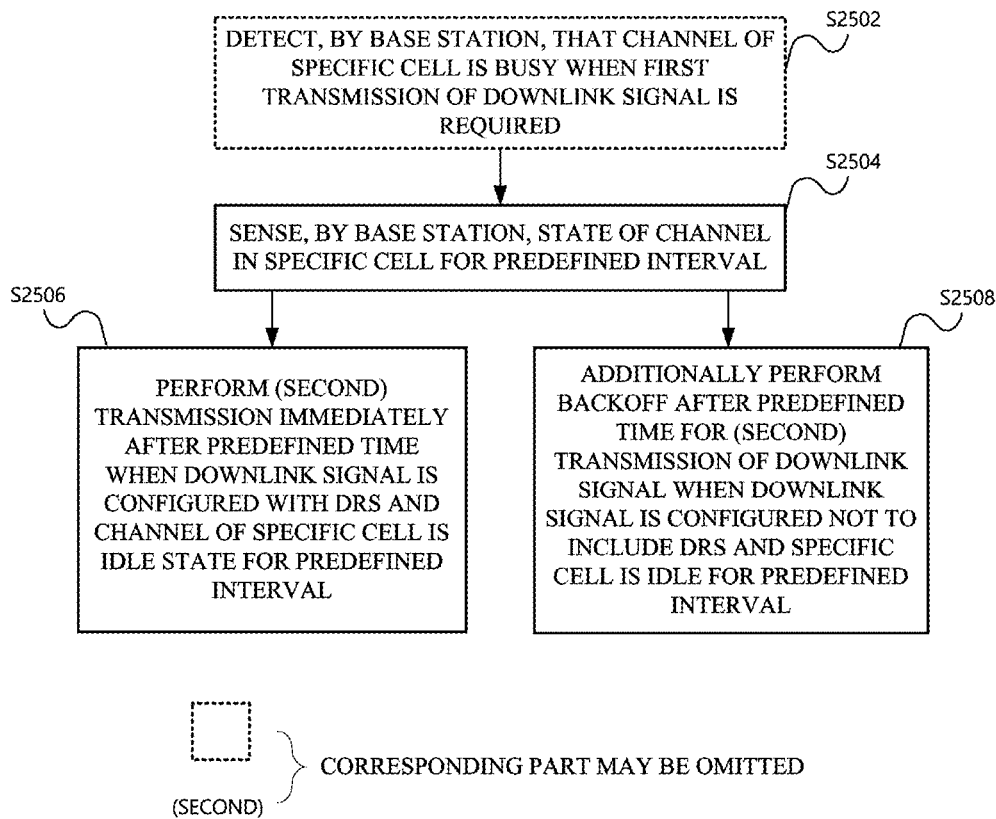

FIG. 25 illustrates a CCA operation for LBT-based DRS transmissions. A process of selectively performing ECCA according to a signal type is illustrated. This example may be limited to the case where a DL transmission process based on category 4 LBT is set.

Referring to FIG. 25, when a first transmission of a downlink signal is required, a base station may detect that a channel of a specific cell is busy (S2502). Accordingly, it is assumed that the first transmission of the downlink signal fails. Then, the base station may sense the state of the channel in a specific cell for a predefined interval in order for the second transmission of the downlink signal (S2504). The predefined interval includes the ICCA defer period and may be properly defined in consideration of the LAA or Wi-Fi maximum packet length. Thereafter, if the downlink signal is composed of a DRS and if the channel of a specific cell is sensed to be idle for a predefined interval, the second transmission of the downlink signal is performed immediately after the predefined interval (S2506). That is, the backoff may be omitted in the case of LAA DRS. On the other hand, if the downlink signal is composed of a non-DRS signal (e.g., PDSCH) and a specific cell is idle for a predefined interval, after a predefined interval for the second transmission of the downlink signal, backoff may be additionally performed (S2508).

In addition, referring to FIG. 25, in the case where transmission of a downlink signal is required, a base station may sense the state of a channel in a specific cell for a predefined interval in order for the channel use of the specific cell (S2504). The predefined interval includes the ICCA defer period and may be properly defined in consideration of the LAA or Wi-Fi maximum packet length. Thereafter, if the downlink signal is composed of a DRS and if the channel of a specific cell is idle for a predefined interval, the transmission of the downlink signal is performed immediately after the predefined interval (S2506). That is, the backoff may be omitted in the case of LAA DRS. On the other hand, if the downlink signal is composed of a non-DRS signal (e.g., PDSCH) and a specific cell is idle for a predefined interval, after a predefined interval for the transmission of the downlink signal, backoff may be additionally performed (S2508).

Here, the DRS may be composed of at least one of CRS, PSS, SSS, and CSI-RS. Also, the DRS is configured in subframe units, and CRS, PSS, SSS, and CSI-RS may all be included in one subframe (refer to FIG. 21). Also, no signal may be transmitted at the end of the subframe in which the DRS is configured (e.g., the last OFDM symbol) (see Example 3 in FIG. 21). Here, the backoff may include generating a random number N (N≥0) within the contention window size and waiting for N slots when the channel in the specific cell is idle (see FIGS. 15 to 16). Here, a specific cell is an unlicensed cell (e.g., LTE-U SCell), and the communication system may be limited to a 3GPP communication system.

Figure 26:
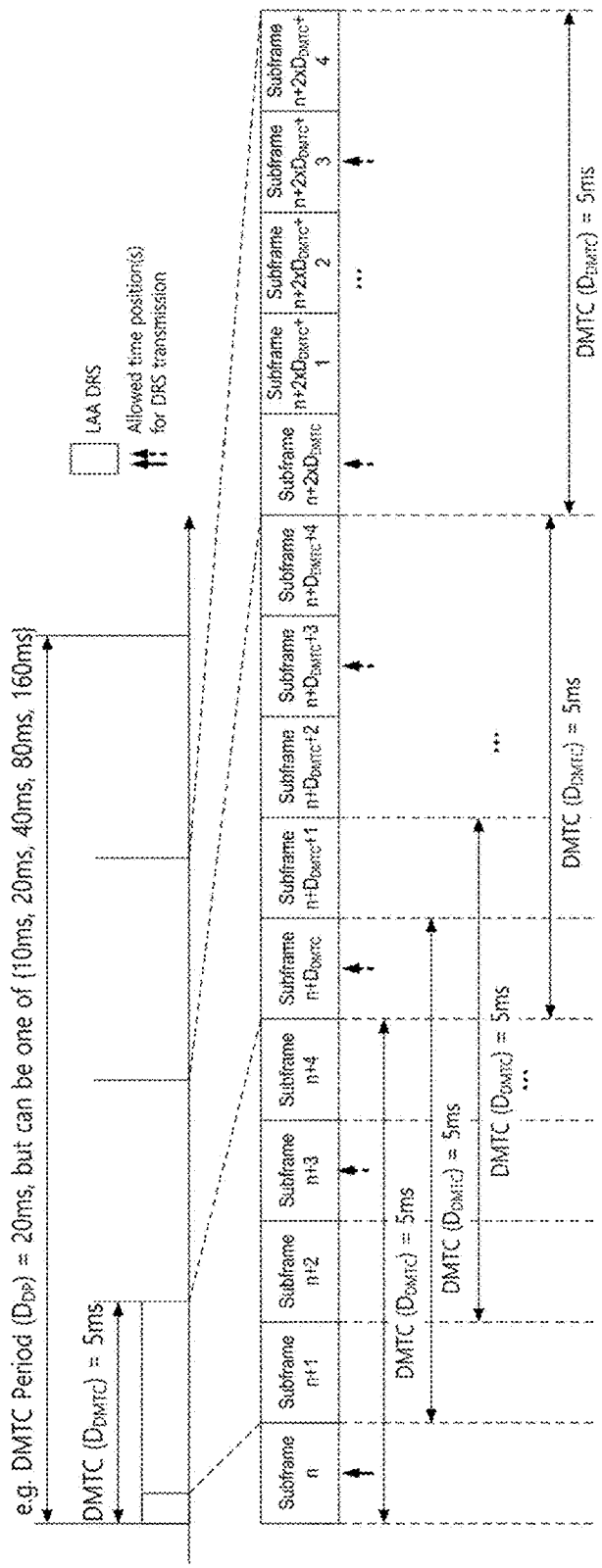
FIGS. 26 and 27 illustrate a DMTC configuration for LAA DRS and a position of a DRS transmission symbol.

FIG. 26 illustrates a DMTC configuration for LAA DRS and a position of a DRS transmission symbol.

An LAA DRS DMTC period may be composed of one of {40 ms, 80 ms, 160 ms} as in a Rel-12 DRS DMTC period. Or, since the DRA transmission probability may be reduced by the LBT in the LAA, in order to increase the transmission opportunity of the LAA DRS, the LAA DRS DMTC period may add 10 ms and 20 ms periods, which are at least 40 ms or less, to the Rel-12 DRS DMTC period. In this case, the base station selects one of {10 ms, 20 ms, 40 ms, 80 ms, and 160 ms} as the DMTC period and informs a user equipment, and the user equipment may perform LAA DRS detection according to the transmission configuration information of the LAA DRS received from the base station. As the DRS to be transmitted on the unlicensed band from the base station is used in the small cell, when it is intended to be fixed in a specific subframe within the DMTC, if the LBT fails in the corresponding subframe, since the LAA DRS transmission may not be performed, there is a need for a method to increase the transmission probability of LBT-based DRS in LAA. At this time, by setting two or more DRS candidate positions in the DMTC, the probability of DRS transmission may be improved as the base station increases the opportunity to transmit LAA DRS. In particular, in setting the transmission opportunity candidate of LAA DRS in subframe units in the DMTC period, it is desirable to set the transmission opportunity of the LAA DRS to have the same transmission opportunity always within the specific DMTC duration (even if the subframe index is changed). This has the advantage that in a DRS transmission overhead and a DRS transmission, DL transmission from a base station in a certain subframe may be set to have the same DRS occasion even after the success of the LBT. The drawing illustrates a method of setting the DMTC period to 20 ms and the DMTC to 5 ms so that the DMTC always has two DRS transmission opportunities. That is, the DMTC may always have two LAA DRS occasions based on a time window of 5 ms (even if the subframe index increases). The example of the drawing is equally applied to the case where the DMTC period is {10 ms, 20 ms, 40 ms, 80 ms, 160 ms}.

Also, because DRS may perform time/frequency synchronization functions, when setting two DRS occasions for LAA DRS transmission, in the case of FDD, the subframe index #0 and the subframe index #5 in which the PSS/SSS transmission is set are always set as one of the two opportunities for LAA DRS transmission, the time/frequency synchronization of a user equipment may be efficiently performed. In this case, resource utilization efficiency may be increased by not transmitting additional PSS/SSS to all two DRS occasions (i.e., transmitting additional PSS/SSS only on one DRS occasion).

Figure 27:
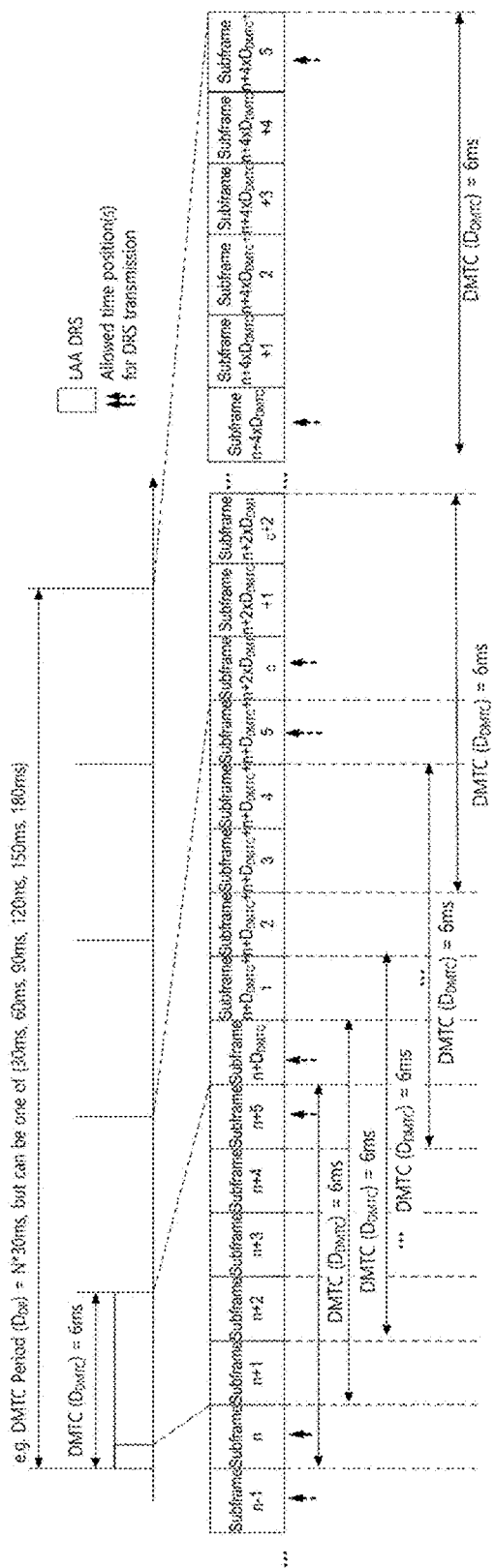

FIG. 27 illustrates a DMTC configuration for LAA DRS and a position of a DRS transmission symbol.

An LAA DRS DMTC period may be set to a multiple of 30 ms, unlike the Rel-12 DRS DMTC period. For example, the LAA DRS DMTC period may be composed of one of {30 ms, 60 ms, 90 ms, 120 ms, 150 ms, 180 ms}. Or, since the DRA transmission probability may be reduced by the LBT in the LAA, in order to increase the transmission opportunity of the LAA DRS, the LAA DRS DMTC period may add a 30 ms period to the Rel-12 DRS DMTC period. Accordingly, the base station selects one of {30 ms, 60 ms, 90 ms, 120 ms, 150 ms, 180 ms} as the DMTC period and informs a user equipment, and the user equipment may perform LAA DRS detection according to the transmission configuration information of the LAA DRS received from the base station. As the DRS to be transmitted on the unlicensed band from the base station is used in the small cell, when it is intended to be fixed in a specific subframe within the DMTC, if the LBT fails in the corresponding subframe, since the LAA DRS transmission may not be performed, there is a need for a method to increase the transmission probability of LBT-based DRS in LAA. At this time, by setting two or more DRS candidate positions in the DMTC, the probability of DRS transmission may be improved as the base station increases the opportunity to transmit LAA DRS. In particular, in setting the transmission opportunity candidate of LAA DRS in subframe units in the DMTC period, it is desirable to set the transmission opportunity of the LAA DRS to have the same transmission opportunity always within the specific DMTC duration (even if the subframe index is changed). This has the advantage that in a DRS transmission overhead and a DRS transmission, DL transmission from a base station in a certain subframe may be set to have the same DRS occasion even after the success of the LBT. The drawing illustrates a method of setting the DMTC period to 30 ms and the DMTC to 6 ms so that the DMTC always has two DRS transmission opportunities. That is, the DMTC may always have two LAA DRS occasions based on a time window of 6 ms (even if the subframe index increases). The example of the drawing is equally applied to the case where the DMTC period is {60 ms, 90 ms, 120 ms, 150 ms, 180 ms}.

Also, because DRS may perform time/frequency synchronization functions, when setting two DRS occasions for LAA DRS transmission, in the case of TDD, the subframe index #0/#1 and the subframe index #5/#6 in which the SSS/PSS transmission is set are always set as one of the two opportunities for LAA DRS transmission, the time/frequency synchronization of a user equipment may be efficiently performed. In this case, resource utilization efficiency may be increased by not transmitting additional PSS/SSS to all two DRS occasions (i.e., transmitting additional PSS/SSS only on one DRS occasion).

Next, a method of transmitting an LBT-based DRS on multiple carriers will be described. To facilitate the description, a method of transmitting LBT-based data on multiple carriers conventionally with reference to FIGS. 28 and 29 will be described first.

Figure 28:
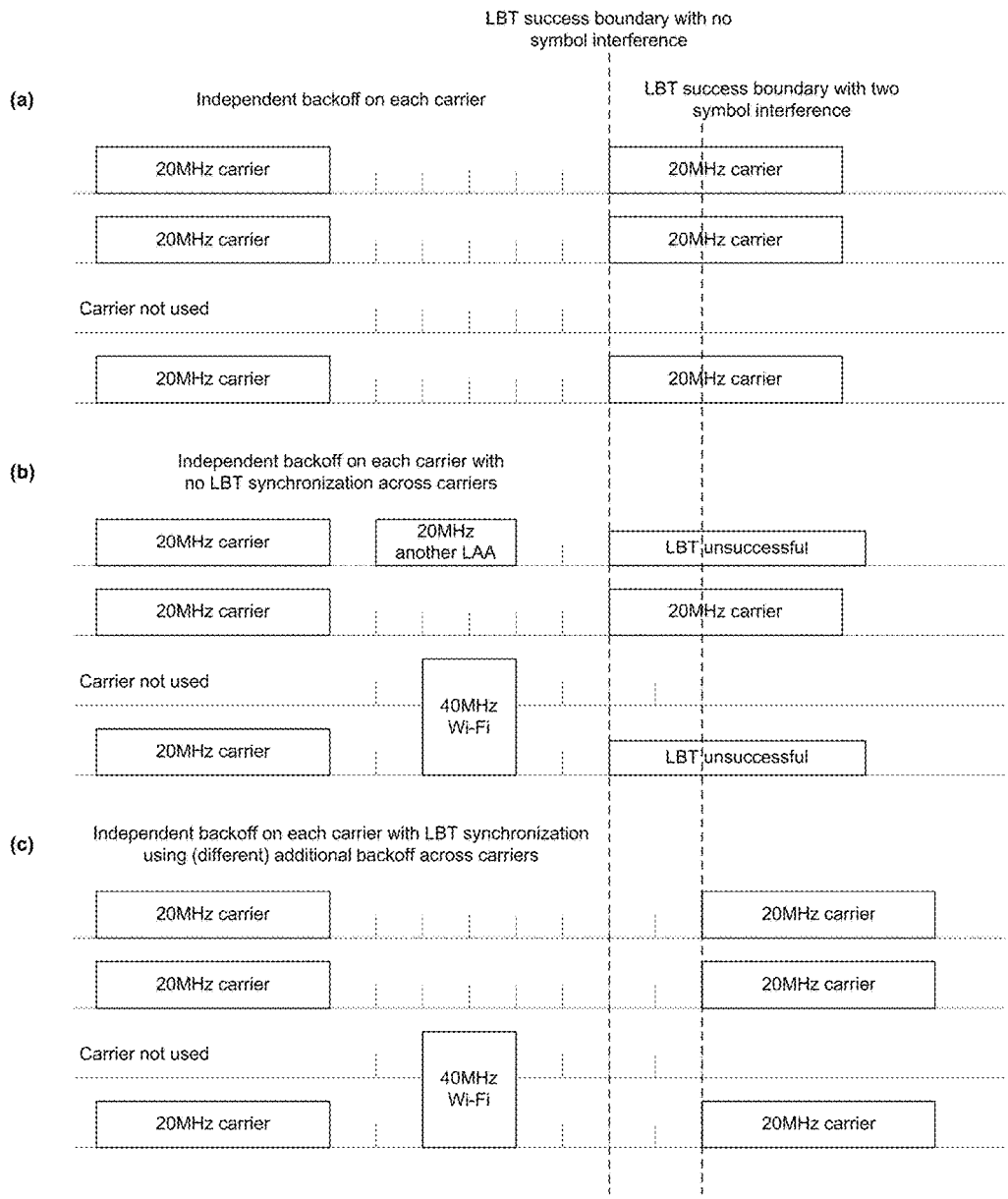
FIGS. 28 and 29 illustrate a conventional method for transmitting data based on LBT on multiple carriers.

Referring to FIG. 28, backoff may be independently performed in each 20 MHz carrier, and 20 MHz carriers may be configured non-continuously. Referring to FIG. 28(a), no interference occurs in all 20 MHz carriers used during backoff, and all carriers may simultaneously transmit data at a time point when the backoff ends (LBT success boundary with no interference). Referring to FIG. 28(b), when an interference (20 MHz another LAA, 40 MHz WiFi) is encountered during the independent backoff of each 20 MHz carrier, carriers with interference at the time point (LBT success boundary with no interference) when the backoff of the 20 MHz carrier without interference ends are determined as that the backoff remains and LBT fails (unsuccessful), so that data may be transmitted only to the 20 MHz carriers where backoff ends. Referring to FIG. 28(c), there is a backoff in a 20 MHz carrier in which there is interference of 40 MHz WiFi at the time point (LBT success boundary with no interference) when the upper two 20 MHz carriers have no interference, and the carrier with no interference is further backed off to the time point (LBT success boundary with two symbol interference) when the backoff of the carrier with interference ends, so that all the carriers may simultaneously transmit data. It may be expected to perform transmission in a wider band instead of performing additional backoff as shown in the drawing.

Figure 29:
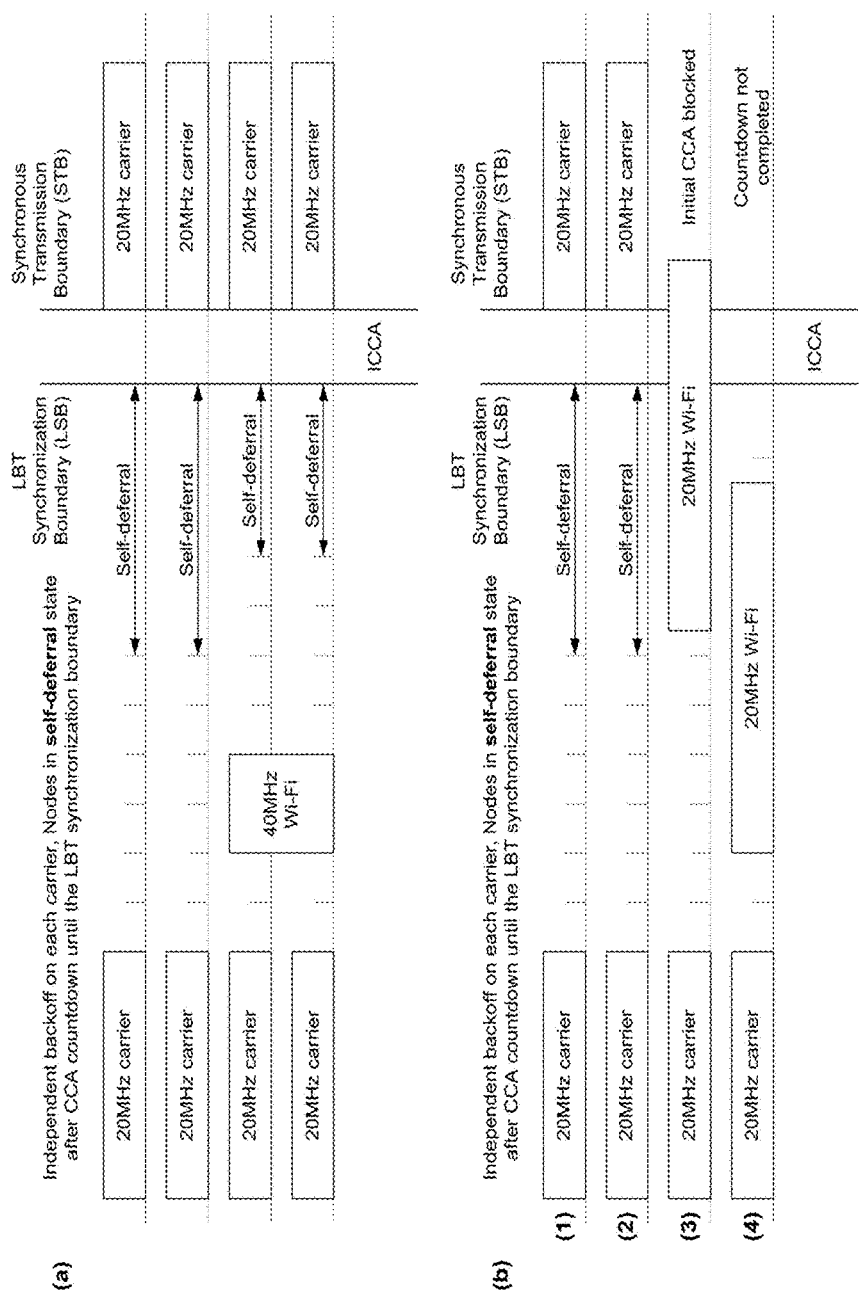

FIG. 29 illustrates an LBT procedure for aligning an LBT synchronization boundary using a self-defer. Referring to FIG. 29, it is possible to independently backoff in each 20 MHz carrier, and to have a self-deferral time instead of transmitting data immediately after the backoff of a specific 20 MHz carrier ends. Referring to FIG. 28(a), backoff may remain due to the presence of interference (40 MHz WiFi) during the backoff in the two lower 20 MHz carriers at the time point when the backoff of the upper two 20 MHz carriers ends. In this case, no data is transmitted in carriers where backoff ends and after all carriers self-defer to the LBT synchronization boundary, a carrier where ICCA is successful may transmit data at the ICCA post synchronization transmission boundary time point. In FIG. 29(a), carriers with interference complete backoff before reaching the LBT synchronization boundary, and while self-deferring to the LBT synchronization boundary, are determined as in a channel idle in all carriers in the ICCA so that they simultaneously transmit data. By having a self-defer period even if the backoff of a specific carrier ends first, it is possible to perform transmission using a wider band after self-defer. Referring to FIG. 29(b), there are carriers whose backoffs are not ended due to interference (20 MHz WiFi) at the time point when the upper two 20 MHz carriers complete backoffs, and self-defer is performed in anticipation of using a full-band, but 20 MHz WiFi interference that enters a self-defer duration may create a channel busy situation in ICCA (3) or backoff may not be completed until the LBT synchronization boundary is reached because the interference is long (4). In this case, data transmission may be performed only on carriers that complete the backoff and are determined as in a channel idle in ICCA (1, 2).

After configuring multiple carries, one base station may transmit DRS on each carrier to perform RRM measurements, coarse time/frequency synchronization, or fine time/frequency synchronization of each carrier. At this time, DRS transmitted from one of the activated carriers of one base station may cause RF leakage to other carriers whose DRS transmission is not performed among activated carriers of the same base station. Due to this, the DL transmission may be delayed in other carriers except for the carrier transmitting the DRS, or it may be determined that the channel is busy in the LBT process, so that the carriers except for the carrier transmitting the DRS may not be able to perform data transmission. Also, the RRM measurement may be degraded due to RF leakage, or data transmission may not be performed on other carriers due to unavailable time/frequency synchronization. Also, the DRS transmission on the unlicensed band may not guarantee that the DRS will be transmitted at the specific time position according to the LBT constraints. If a user equipment assumes the presence of DRS when the DRS is not actually transmitted from the base station, it causes deterioration of the measurement quality reported by the user equipment.

Figure 30:
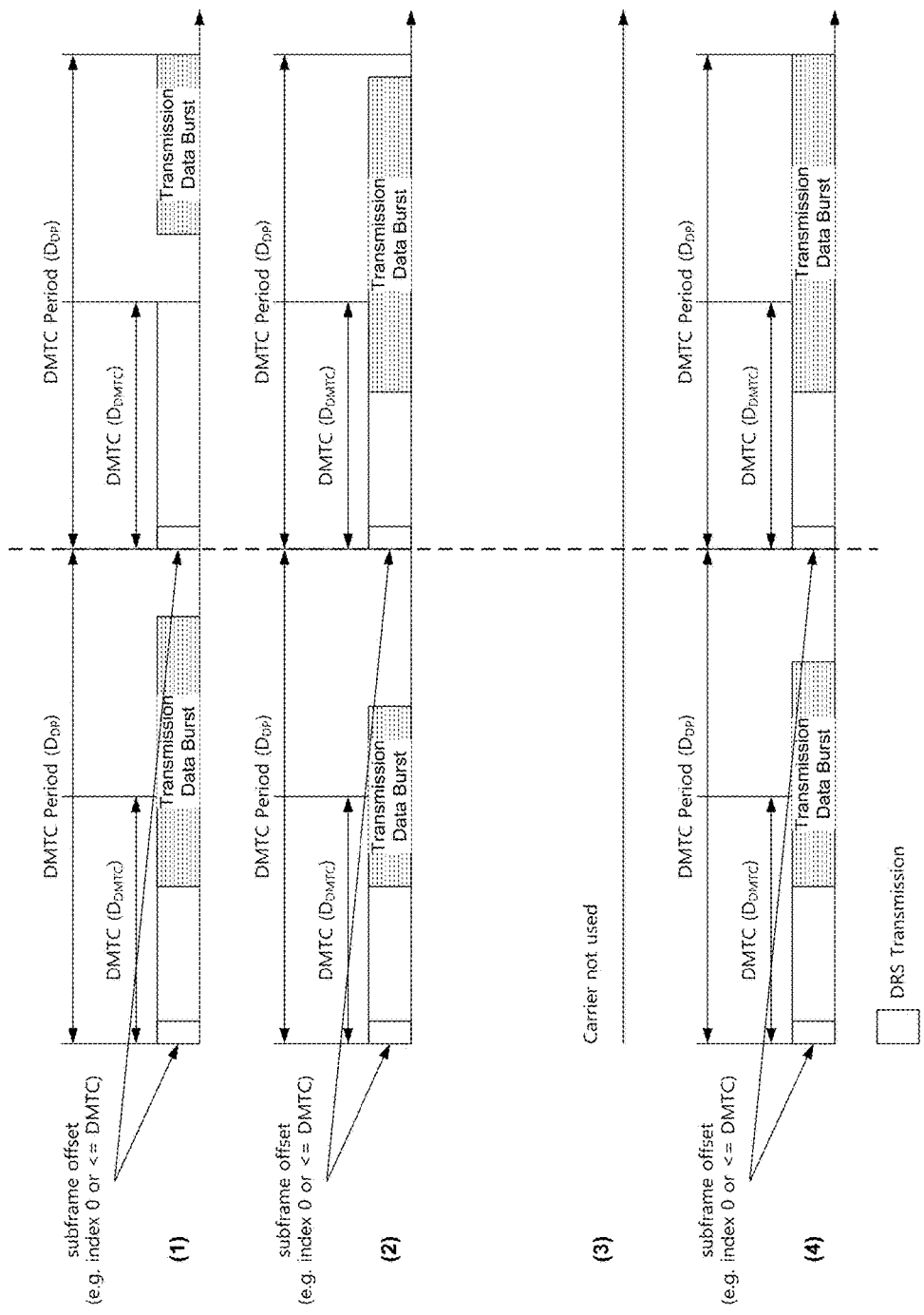
FIGS. 30 to 33 illustrate a synchronized DRS transmission method in multiple carriers.

FIG. 30 shows an example of a synchronized DRS transmission method in multiple carriers. The multiple carriers may be limited to active carrier(s). In FIG. 30, (1), (2), and (4) refer to activated carrier(s) used as SCell in an unlicensed band, and (3) refers to an inactive carrier among carriers configured to a user equipment.

Referring to FIG. 30, a base station may set DRS transmission time points to the same among carriers that perform DRS transmission among activated carriers. For example, for the activated carriers, the DMTC period, the DMTC, and the subframe offset may all be set the same. Here, the subframe offset represents the offset in which the DRS occasion is located within the DMTC. Thus, the base station may transmit the DRS on the active carriers at the same time point, and on the assumption that the DMTC period, the DMTC, and the subframe offset are all the same for the DRS transmission on the activated carriers of one base station, the user equipment may perform DRS detection on each carrier of the unlicensed band. That is, the base station informs the user equipment of the same DRS configuration information for cells belonging to one base station or the unlicensed band, and therefore, the user equipment detects a DRS transmitted from the cells in the unlicensed band with one DRS configuration thereby performing RRM measurement, simple time/frequency synchronization, CSI measurement, and fine time/frequency synchronization.

Figure 31:
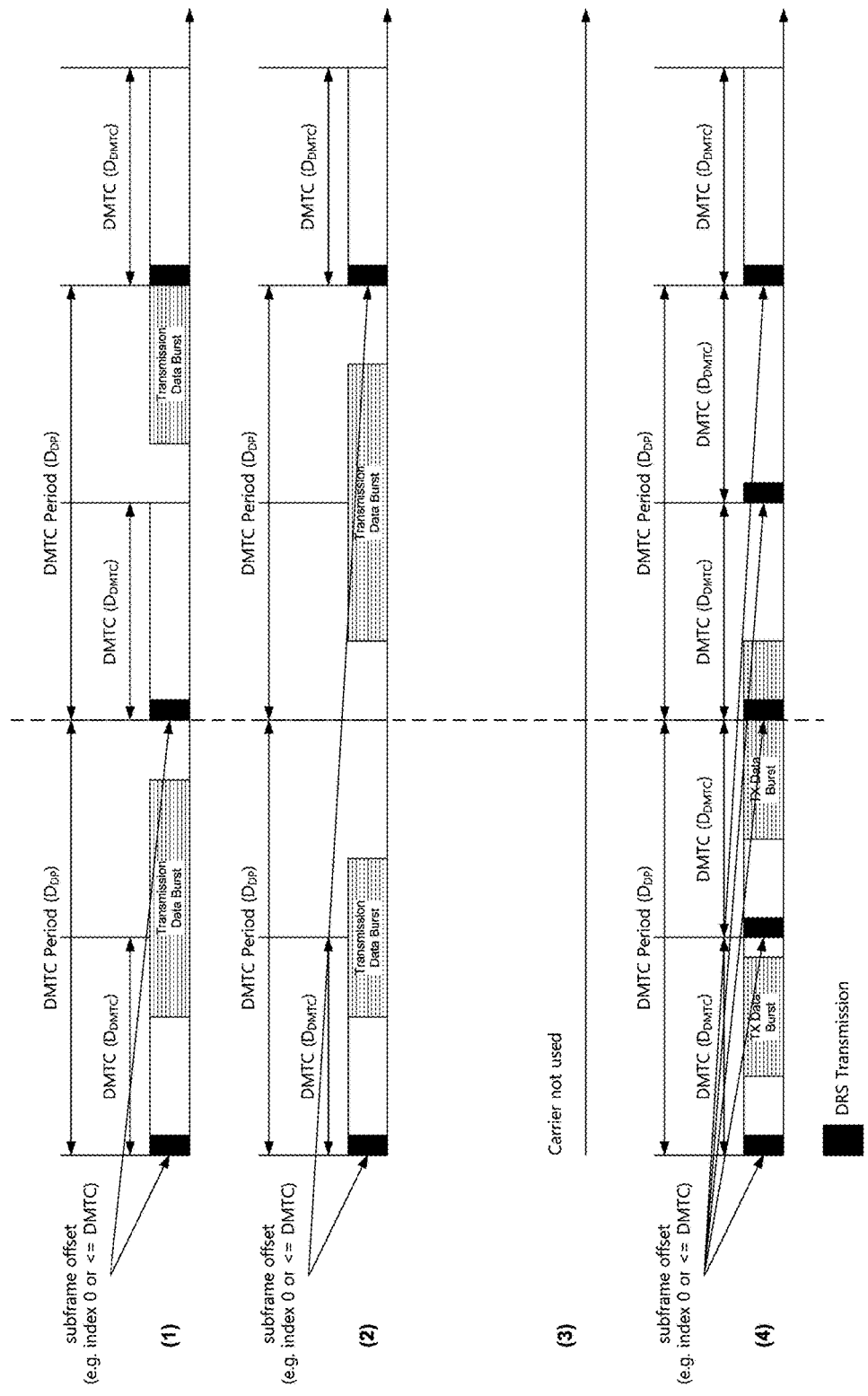

FIG. 31 shows another example of a synchronized DRS transmission method in multiple carriers. The multiple carriers may be limited to active carrier(s). In FIG. 31, (1), (2), and (4) refer to activated carrier(s) used as SCell in an unlicensed band, and (3) refers to an inactive carrier among carriers configured to a user equipment.

Referring to FIG. 31, a base station may set DRS transmission time points to be in an inclusion relationship in carriers that perform DRS transmission among activated carriers. For example, for activated carriers, the DMTC period may be set independently for each of the carriers, but may be set to a multiple relationship of each other, and set the DMTC and the subframe offset to the same for all carriers. Here, the subframe offset represents the offset in which the DRS occasion is located within the DMTC. The DMTC period, for example, may be 40 ms, 80 ms, and 160 ms, and may be 20 ms and 10 ms in consideration of further increasing the cell capability for DRS transmission. For this, the base station may inform the user equipment of different DRS configuration information (e.g., different DMTC periods for each carrier/cell) for each carrier/cell for carriers/cells in an unlicensed band. Further, on the assumption that for activated carriers, the DRS period is in a multiple relationship and the DMTC and the subframe offset values are both the same by using the DRS configuration information received from the base station, the user equipment may perform DRS detection on each carrier of the unlicensed band. For example, the base station informs the user equipment of different DRS period information for cells in an unlicensed band and therefore, the user equipment detects a DRS transmitted from the cells in the unlicensed band with the corresponding DRS configuration thereby performing RRM measurement, simple time/frequency synchronization, CSI measurement, and fine time/frequency synchronization.

Figure 32:
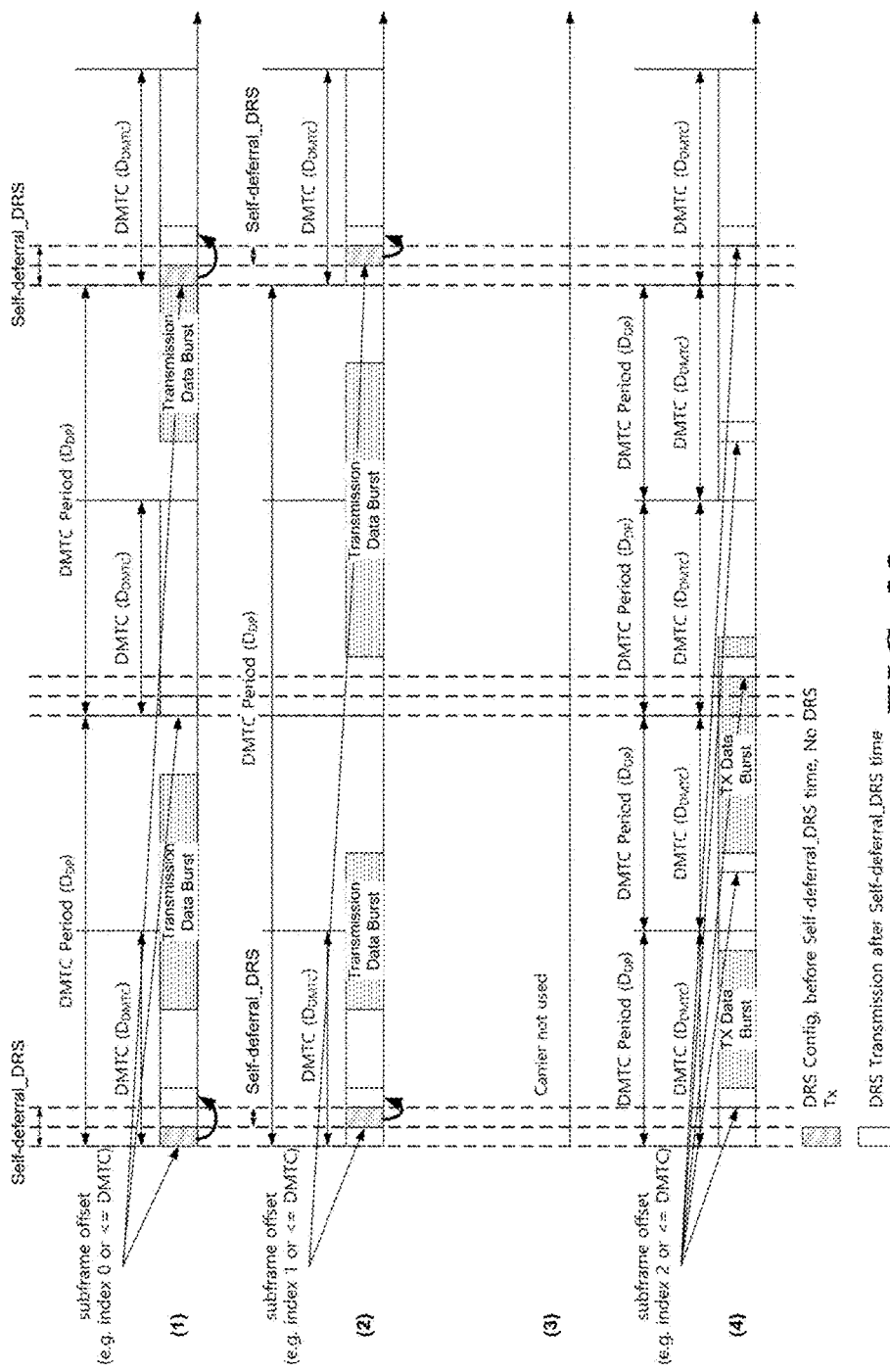

FIG. 32 shows another example of a synchronized DRS transmission method in multiple carriers. The multiple carriers may be limited to active carrier(s). In FIG. 32, (1), (2), and (4) refer to activated carrier(s) used as SCell in an unlicensed band, and (3) refers to an inactive carrier among carriers configured to a user equipment.

Referring to FIG. 32, if the DRS configurations configured in the SCell on each unlicensed band are set independently each other, that is, when the DMCT period, the DMTC, and the subframe offsets are independently set, a DRS transmission may occur at different time points based on a time point when each of the activated carriers of the base station performs a DRS transmission. Here, the subframe offset represents the offset in which the DRS occasion is located within the DMTC. To synchronize DRS transmissions, the base station may set the self-defer period_DRS so that DRS transmissions may occur simultaneously on different carriers based on the time point when DRS transmission is performed on each of the activated carriers. Specifically, if the DRS transmissions are transmitted with time intervals within the DMTC, the base station may wait for the self-defer period_DRS to allow the DRS transmissions to be performed concurrently on different carriers. When different DMTC configurations are received for the active carriers from the base station, under the assumption that DRS transmissions occur on different carriers at the time points corresponding to the last subframe offset among the DRS transmissions in the DMTC set for each of the activated carriers, the user equipment may perform DRS detection. Even if the base station informs the user equipment of different DRS configuration information for unlicensed band cells belonging to one base station, after receiving different DRS configurations, the user equipment detects the DRS transmitted from the cells of the unlicensed band according to the proposed method thereby performing RRM measurement, coarse time/frequency synchronization, CSI measurement, and fine time/frequency synchronization.

Figure 33:
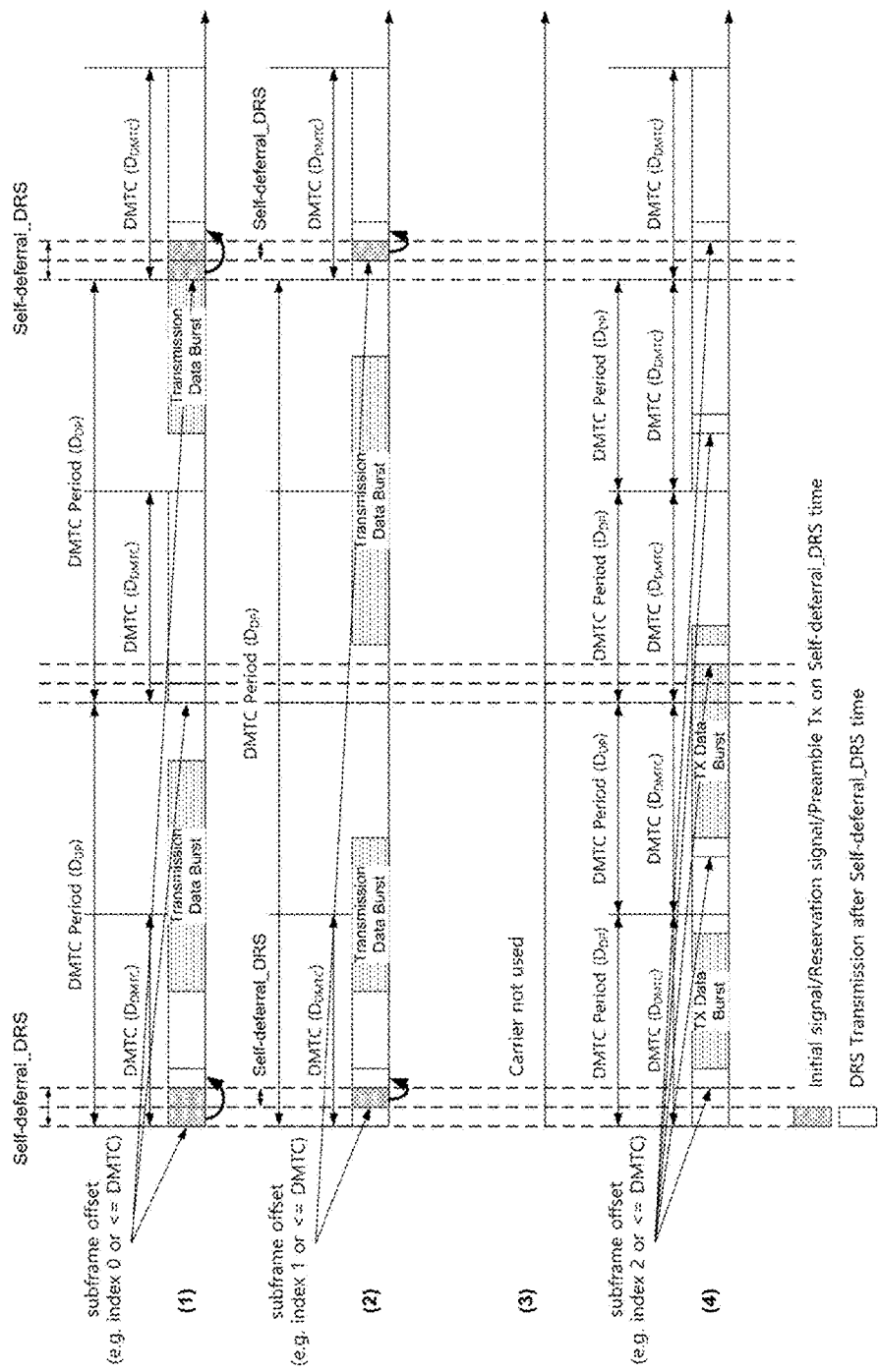

FIG. 33 illustrates the transmission of an initial signal/reservation signal/preamble during a self-defer period for DRS synchronization. In FIG. 33, (1), (2), and (4) refer to activated carrier(s) used as SCell in an unlicensed band, and (3) refers to an inactive carrier among carriers configured to a user equipment.

Referring to FIG. 33, if the DRS configurations configured in the SCell on each unlicensed band are set independently each other, that is, when the DMCT period, the DMTC, and the subframe offsets are independently set, a DRS transmission may occur at different time points based on a time point when each of the activated carriers of the base station performs a DRS transmission. Here, the subframe offset represents the offset in which the DRS occasion is located within the DMTC. To synchronize DRS transmissions, the base station may set the self-defer period_DRS so that DRS transmissions may occur simultaneously on different carriers based on the time point when DRS transmission is performed on each of the activated carriers. Specifically, if the DRS transmissions are transmitted with time intervals within the DMTC, the base station may wait for the self-defer period_DRS to allow the DRS transmissions to be performed concurrently on different carriers. However, if there is no signal on the carrier(s) during the self-defer period_DRS, another LAA node or WiFi device may determine that the channel of the corresponding carrier is idle and use that channel during the self-defer period_DRS. Therefore, during the self-defer period_DRS, the base station may transmit a signal such as an initial signal/reservation signal/preamble signal that may reserve the channel, thereby not determining that the channel is idle. Here, a signal such as an initial signal/reservation signal/preamble or the like may use a dummy signal of more than a specific power or a signal containing specific information.

When the user equipment receives different DMTC configurations for the active carriers from the base station, under the assumption that DRS transmissions occur on different carriers at the time points corresponding to the last subframe offset among the DRS transmissions in the DMTC set for each of the activated carriers, the user equipment may perform DRS detection. Even if the base station informs the user equipment of different DRS configuration information for unlicensed band cells belonging to one base station, after receiving different DRS configurations, the user equipment detects the DRS transmitted from the cells of the unlicensed band according to the proposed method thereby performing RRM measurement, coarse time/frequency synchronization, CSI measurement, and fine time/frequency synchronization.

When a reservation signal is used, the power leakage to the adjacent channel may be sufficiently large, and when a reservation signal is used in all of the self-defer periods as shown in FIG. 33, the backoff of the adjacent channel may be affected. For example, some channels may self-defer after backoff, but some channels may not be able to reduce backoff counters because a channel busy situation occurs due to the power leakage of a reservation signal at duration in which backoff is in progress. To prevent this, a channel may be protected using a reservation signal only at the duration that all channels self-defer. In addition, since the influence of the power leakage may affect only adjacent channels, if all the channels do not self-defer but the adjacent channel does not perform backoff (even at the duration that a carrier performs backoff), an additional reservation signal may be used.

Figure 34:
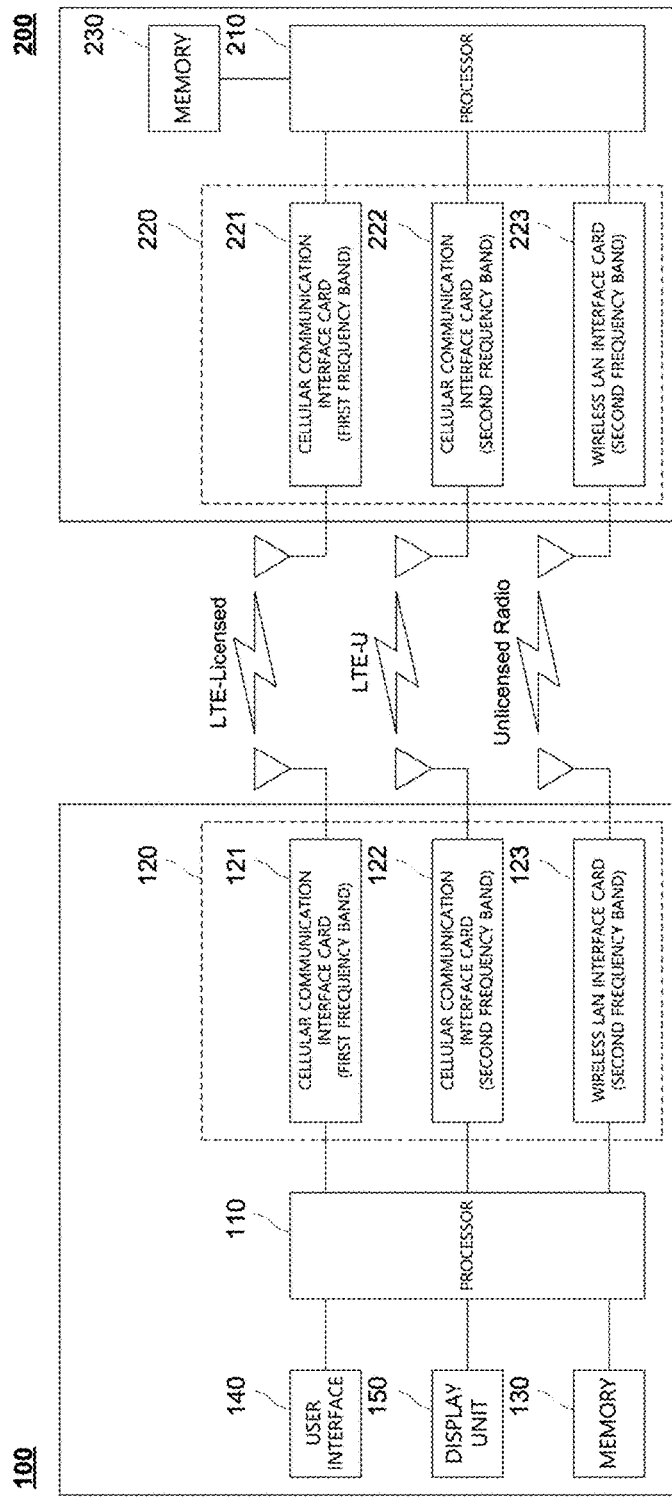
FIG. 34 illustrates a configuration of a user equipment and a base station according to an embodiment of the present invention.

Referring to FIG. 34, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention. For example, DRS may be detected based on the LAA DRS transmission parameter and the LBT-based DRS transmission scheme of FIGS. 18 to 27 and 30 to 33, and accordingly, RRM measurement and downlink synchronization may be acquired.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 18, the communication module 120 is illustrated as the integrated module, but the respective network interface cards may be independently disposed according to a circuit configuration or a purpose unlike FIG. 18.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may transmit/process the downlink signal according to the proposal of the present invention. For example, DRS may be transmitted based on the LAA DRS transmission parameter and the LBT-based DRS transmission scheme of FIGS. 18 to 27 and 30 to 33.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 18, the communication module 220 is illustrated as the integrated module, but the respective network interface cards may be independently disposed according to the circuit configuration or the purpose unlike FIG. 18.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 18, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is usable in various communication devices (e.g., a station or access point using unlicensed band communication, a station or a base station using cellular communication, or the like) used in a wireless communication system.

The invention claimed is:

1. A method for performing downlink transmission in a specific cell by a base station in a cellular wireless communication system, the method comprising:
    when the downlink transmission includes a physical downlink shared channel (PDSCH) and a channel in which the downlink transmission is performed is sensed to be idle for a first predefined interval, performing backoff procedure after the first predefined interval to perform the downlink transmission; and
    when the downlink transmission includes a Discovery Reference Signal (DRS) and does not include the PDSCH, and the channel in which the downlink transmission is performed is sensed to be idle for a second predefined interval, performing the downlink transmission immediately after the second predefined interval.

2. The method of claim 1, wherein the DRS is transmitted in any subframe within a periodically-configured Discovery Measurement Timing Configuration (DMTC).

3. The method of claim 1, wherein the DRS includes at least one of Cell-specific Reference Signal (CRS), Primary Synchronization Signal (PSS), Secondary Synchronization Signal (SSS), and Channel State Information (CSI)-RS.

4. The method of claim 1, wherein a last Orthogonal Frequency Division Multiplexing (OFDM) symbol of a subframe including the DRS is empty.

5. The method of claim 1, wherein the channel in which the downlink transmission is performed is sensed after a previous downlink transmission fails.

6. The method of claim 5, wherein the previous downlink transmission fails because the channel in which the downlink transmission is performed is busy.

7. The method of claim 1, wherein the backoff procedure comprises generating a random number N (N≥0) in a contention window size and waiting for N slots when the channel in which the downlink transmission is performed is idle.

8. The method of claim 1, wherein the specific cell is a cell using unlicensed spectrum, and the cellular communication system is a 3rd Generation Partnership Project (3GPP) communication system.

9. A base station performing a downlink transmission in a specific cell in a cellular wireless communication system, the base station comprising:
    a wireless communication module; and
    a processor,
    when the downlink transmission includes a physical downlink shared channel (PDSCH) and a channel in which the downlink transmission is performed is sensed to be idle for a first predefined interval, wherein the processor is configured to perform backoff procedure after the first predefined time to perform the downlink transmission, and when the downlink transmission includes a Discovery Reference Signal (DRS) and does not include the PDSCH, and the channel in which the downlink transmission is performed is sensed to be idle for a second predefined interval, wherein the processor is configured to perform the downlink transmission immediately after the second predefined interval.

10. The base station of claim 9, wherein the DRS is transmitted in any subframe within a periodically-configured Discovery Measurement Timing Configuration (DMTC).

11. The base station of claim 9, wherein the DRS includes at least one of Cell-specific Reference Signal (CRS), Primary Synchronization Signal (PSS), Secondary Synchronization Signal (SSS), and Channel State Information (CSI)-RS.

12. The base station of claim 9, wherein a last Orthogonal Frequency Division Multiplexing (OFDM) symbol of a subframe including the DRS is empty.

13. The base station of claim 9, wherein the channel in which the downlink transmission is performed is sensed after a previous downlink transmission fails.

14. The base station of claim 13, wherein the previous downlink transmission fails because the channel in which the downlink transmission is performed is busy.

15. The base station of claim 9, wherein the backoff procedure comprises generating a random number N (N≥0) in a contention window size and waiting for N slots when the channel in which the downlink transmission is performed is idle.

16. The base station of claim 9, wherein the specific cell is a cell using unlicensed spectrum, and the cellular wireless communication system is a 3rd Generation Partnership Project (3GPP) communication system.

* * * * *